United States Patent
Lee et al.

(10) Patent No.: US 9,773,100 B2
(45) Date of Patent: Sep. 26, 2017

(54) METHOD AND DEVICE FOR PLAYING CONTENTS

(71) Applicant: LG ELECTRONICS INC., Seoul (KR)

(72) Inventors: Minsoo Lee, Seoul (KR); Sunghyun Cho, Seoul (KR); Soojin Hwang, Seoul (KR); Suk Kim, Seoul (KR); Hyeonjae Lee, Seoul (KR); Younghwan Kwon, Seoul (KR); Jinpil Kim, Seoul (KR); Jaekoo Lee, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/770,370

(22) PCT Filed: Feb. 27, 2014

(86) PCT No.: PCT/KR2014/001626
§ 371 (c)(1),
(2) Date: Aug. 25, 2015

(87) PCT Pub. No.: WO2014/133337
PCT Pub. Date: Sep. 4, 2014

(65) Prior Publication Data
US 2016/0004849 A1     Jan. 7, 2016

Related U.S. Application Data

(60) Provisional application No. 61/770,287, filed on Feb. 27, 2013, provisional application No. 61/823,921, (Continued)

(51) Int. Cl.
*G06F 21/10*     (2013.01)
*G06F 21/16*     (2013.01)
(Continued)

(52) U.S. Cl.
CPC .............. *G06F 21/16* (2013.01); *G06F 21/10* (2013.01); *H04N 21/2541* (2013.01);
(Continued)

(58) Field of Classification Search
CPC .................................................. H04L 2209/603
See application file for complete search history.

(56) References Cited

U.S. PATENT DOCUMENTS

2003/0056106 A1*   3/2003   Wang ...................... G06F 21/10
                                                   713/189
2003/0149671 A1*   8/2003   Yamamoto .............. G06F 21/10
                                                   705/59
(Continued)

FOREIGN PATENT DOCUMENTS

EP         0 506 400 A2    9/1992
JP         2011-233153 A    11/2011
(Continued)

*Primary Examiner* — Josnel Jeudy
(74) *Attorney, Agent, or Firm* — Birch, Stewart, Kolasch & Birch, LLP

(57) ABSTRACT

The present invention provides a method for playing contents, which are stored in a storage device connected via at least one interface, the method comprising: detecting a connection of the storage device; transmitting transaction information stored in the detected storage device to a license server, wherein the transaction information includes transaction identification information which identifies a corresponding transaction and a user; receiving, from the license server, license information allowing to play the contents; and playing the contents on the basis of the license information, wherein the license information includes a license file and a license key.

10 Claims, 22 Drawing Sheets

Related U.S. Application Data filed on May 16, 2013, provisional application No. 61/823,922, filed on May 16, 2013, provisional application No. 61/836,166, filed on Jun. 18, 2013.

(51) Int. Cl.
| | |
|---|---|
| *H04N 21/254* | (2011.01) |
| *H04N 21/258* | (2011.01) |
| *H04N 21/432* | (2011.01) |
| *H04N 21/4627* | (2011.01) |
| *H04N 21/278* | (2011.01) |
| *H04N 21/6334* | (2011.01) |

(52) U.S. Cl.
CPC ..... *H04N 21/25875* (2013.01); *H04N 21/278* (2013.01); *H04N 21/4325* (2013.01); *H04N 21/4627* (2013.01); *H04N 21/6334* (2013.01); *G06F 2221/2101* (2013.01)

(56) References Cited

U.S. PATENT DOCUMENTS

| | | | |
|---|---|---|---|
| 2004/0025058 A1* | 2/2004 | Kuriya | G06F 21/10 726/29 |
| 2008/0040283 A1* | 2/2008 | Morris | G06F 21/10 705/59 |
| 2008/0263582 A1* | 10/2008 | Okamoto | H04N 7/1675 725/29 |
| 2008/0289050 A1* | 11/2008 | Kawamoto | G06F 21/10 726/28 |
| 2009/0063629 A1 | 3/2009 | Jeong et al. | |
| 2009/0279850 A1* | 11/2009 | Hirata | H04N 5/76 386/248 |
| 2011/0145902 A1 | 6/2011 | Kim et al. | |
| 2011/0162075 A1* | 6/2011 | Lin | G06F 21/10 726/26 |
| 2016/0004849 A1* | 1/2016 | Lee | H04N 21/278 726/27 |
| 2016/0173947 A1* | 6/2016 | Cho | H04N 21/835 725/31 |

FOREIGN PATENT DOCUMENTS

| | | |
|---|---|---|
| KR | 10-2004-0053158 A | 6/2004 |
| KR | 10-2006-0021919 A | 3/2006 |
| KR | 10-2008-0024957 A | 3/2008 |
| KR | 10-2011-0067870 A | 6/2011 |

* cited by examiner

FIG. 7

| Element | Attribute |
|---|---|
| Advertisement information (710) | |
| | *Target Device* (711) |
| | *Category* (712) |
| | *Scope* (713) |
| | *providerID* (714) |
| | *ad_ID* (715) |
| | *updateNum* (716) |
| Advertisement playback time information (720) | |
| | *startTime*(721) |
| | *endTime*(722) |
| Market information (730) | |
| | *URL*(731) |

FIG. 16

| Location section (1610) | Asset information section (1620) | Metadata section (1630) |
|---|---|---|
| License server location information (1611) | Security level information (1621) | Metadata key identification information (1631) |
| Retailer location information (1612) | Media profile information (1622) | Sample number information (1632) |
| Reserved information (1613) | Asset identification information (1623) | Size information (1633) |

FIG. 17

| Level | Content level (1710) | Video, profile (1711) (codec, profile, resolution) | Audio profile (1713) | Device level (1720) |
|---|---|---|---|---|
| 1 | SD | H.264, First profile, 480 | First profile | Content playback function(level 1)<br>Copy/move/delete function(level 1) |
| 2 | HD | H.264, Second profile, 1080 | Second profile | Content playback function(level 1, 2)<br>Copy/move/delete function(level 1, 2) |
| 3 | UHD | H.265, Third profile, 1080 | Third profile | Content playback function(level 1, 2, 3)<br>Copy/move/delete function(level 1, 2, 3) |

# METHOD AND DEVICE FOR PLAYING CONTENTS

CROSS REFERENCE TO RELATED APPLICATIONS

This application is the National Phase of PCT International Application No. PCT/KR2014/001626, filed on Feb. 27, 2014, which claims priority under 35 U.S.C. 119(e) to U.S. Provisional Application No. 61/770,287, filed on Feb. 27, 2013, 61/823,921 filed on May 16, 2013, 61/823,922 filed on May 16, 2013 and 61/836,166 filed on Jun. 18, 2013, all of which are hereby expressly incorporated by reference into the present application.

TECHNICAL FIELD

The present invention relates to a method and device for playing content and, more particularly, to a method and device for playing content, stored in a storage device, in a device forming a network service or playing content transmitted through an external device or an Internet server.

BACKGROUND ART

As an ultra high definition (UHD) technology that is super definition exceeding full HD is recently introduced into smart phones and smart TV, we will face various high-definition and super high definition content in several fields, such as movies, concerts, and sports, in addition to common air channel broadcasting.

If existing playback devices are unable to play various high-definition and super high definition content, however, a user cannot use such content. Accordingly, a playback device needs to be capable of playing high-definition and super high definition content, and there will be a need for a scheme in which high-definition and super high definition content is capable of being played even in existing playback devices.

In order to play such high definition content, a user requires a legitimate right. For more efficient management, a method of managing high definition content will also be required. Furthermore, there will be a need for an anticopying method for the legitimate distribution and use of high definition content.

DISCLOSURE

Technical Problem

The present invention is to define the configuration of a device capable of playing content stored in a storage device, the configuration of a network, and system architecture including a transmission protocol between a server and a device.

Furthermore, the present invention is to provide a method of automatically connecting another playback device when a storage device is inserted into a playback device and playing content in another playback device.

Furthermore, the present invention is to define a content directory structure and file format for efficient management of secure high definition content data.

Furthermore, the present invention is to define metadata and a playback list for playback in a second playback device.

Furthermore, the present invention is to provide a method of automatically backing up the high definition content of a storage device that is being played to the memory of a playback device.

Furthermore, the present invention is to provide a method of obtaining license information for playing high definition content stored in a storage device.

Furthermore, the present invention is to provide a protocol and system architecture in which replaceable content can be searched for or downloaded from an external server in the case of a device incapable of playing content stored in a storage device.

Technical Solution

The present invention provides the configuration of a device capable of playing content stored in a storage device, the configuration of a network, and system architecture including a transmission protocol between a server and a device.

Furthermore, the present invention provides a method of checking a connected interface when a storage device is inserted into a playback device so that content is automatically played in another playback device.

Furthermore, the present invention provides a content directory structure and file format for efficient management of secure high definition content data.

Furthermore, the present invention provides metadata and a playback list for playback in a second playback device.

Furthermore, the present invention provides a method of automatically backing up the high definition content of a storage device that is being played back in the memory of a playback device.

Furthermore, the present invention provides a method for obtaining license information for playing high definition content stored in a storage device.

Furthermore, the present invention provides a protocol and system architecture capable of searching an external server for replaceable content or downloading the replaceable content from the external server in the case of a device incapable of playing content stored in a storage device.

Advantageous Effects

Although a storage device in which the content of a format or profile not supported by a user device is stored is connected, a user can automatically search for and/or download a replaceable content file which is playable in the user device through the Internet and can play high definition content or super high definition content.

Accordingly, if a user device is incapable of playing content stored in a storage device, a user does not need to perform an inconvenient procedure for directly accessing a download server and searches for content or selecting and downloading retrieved content.

Furthermore, a user can be provided with more various content services because replaceable content is searched for and played in the case of a playback device having poor performance.

Furthermore, secure high definition content data can be managed and played more efficiently because a directory structure and file format of high definition content are provided.

Furthermore, although a separate certificate is not obtained by obtaining license information about high definition content from a license server, a function can be added to an existing certificated device and high definition content can be used through interoperation with the added function.

DESCRIPTION OF DRAWINGS

FIG. 7 is an embodiment to which the present invention is applied and shows metadata provided in order to play the content of the storage device, inserted into a first playback device, in a second playback device.

FIGS. 15 and 16 are embodiments to which the present invention is applied and show the formats of high definition content to which the present invention is applied.

FIG. 17 is an embodiment to which the present invention is applied and shows the levels of high definition content to which the present invention is applied and the levels of a playback device using the levels of high definition content.

BEST MODE

Figure 1:
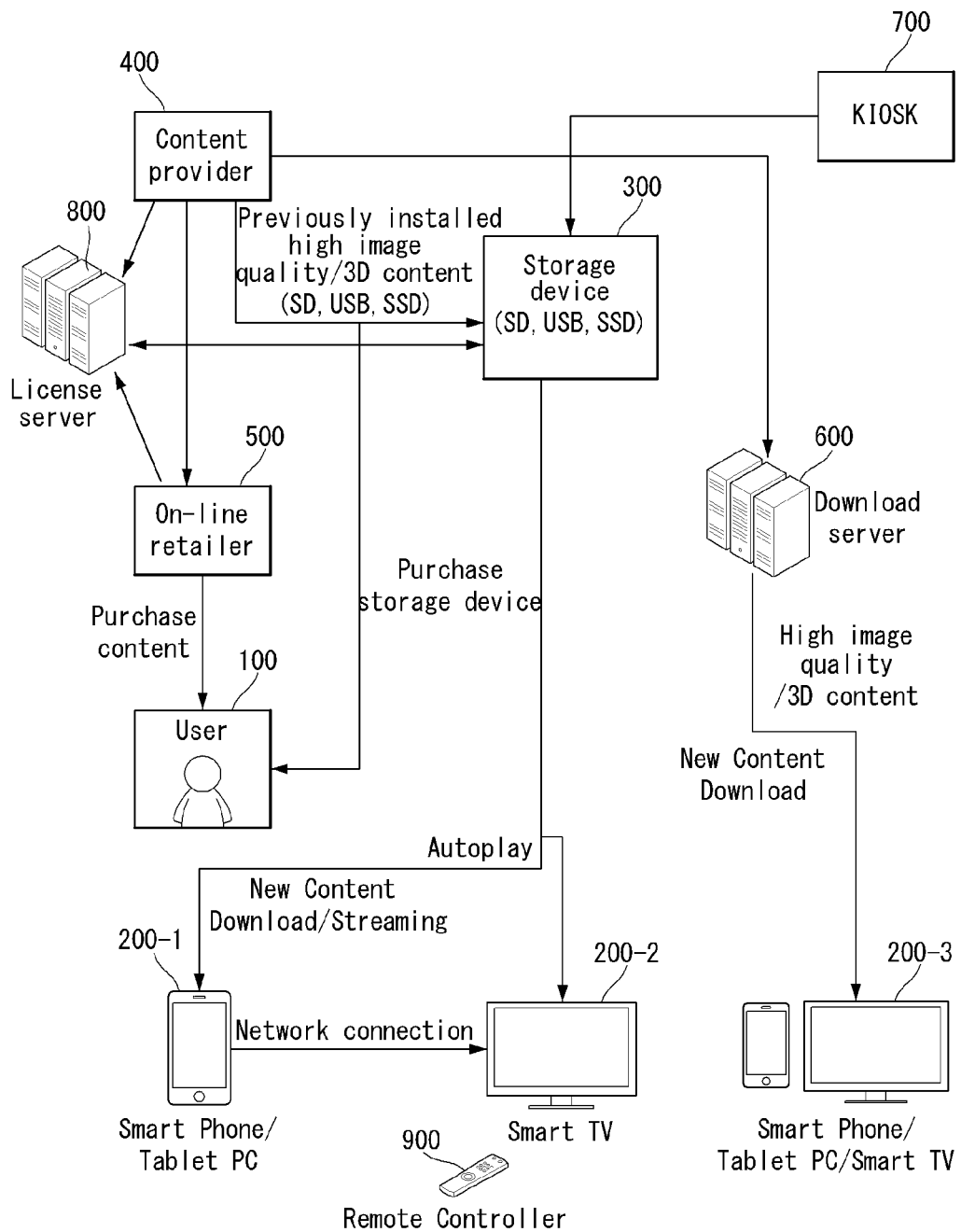
FIG. 1 is an embodiment to which the present invention is applied and illustrates a system for using a secure high definition content service.

The present invention provides a method for playing content stored in a storage device connected through at least one interface, including steps of detecting a connection of the storage device;

transmitting transaction information to a license server, wherein the transaction information is stored in the storage device and includes transaction identification information used for identifying a corresponding transaction and user;

receiving license information from the license server, wherein the license information allows the playback of the content; and playing the content based on the license information.

In the present invention, the content includes pieces of content corresponding to multiple versions, and the multiple versions represent image quality.

In the present invention, each of the pieces of content corresponding to the multiple versions corresponds to a piece of right information, and the right information allows the storage device to obtain the license information (a license file & a license key).

In the present invention, the method further includes steps of checking whether a right to copy or move the content is present through a server when the content is copied or moved to other storage device by a user and copying or moving the content to the other storage device if, as a result of the check, the right to copy or move the content is present.

In the present invention, when the content is copied or moved to an unlicensed storage device by a user, only the data file of the content is transmitted and new license information is required to play the content.

In the present invention, the format of the content includes location information, and the location information includes at least one of license server location information and retailer location information.

In the present invention, the interface includes at least one of a universal serial bus (USB) interface, a high-definition multimedia interface (HDMI), a secure digital (SD) card reader, and a wired/wireless network.

In the present invention, the step of playing the content includes a step of determining whether the content is to be played based on level information of a playback device, wherein the function of the playback device corresponds to level information of the content.

In the present invention, if the level information of the playback device is not lower than the level information of the content, the content is played.

The present invention provides a device for playing content stored in a storage device connected through at least one interface, including an interface unit which detects a connection of the storage device; a controller which sends transaction information stored in the detected storage device to a license server, receives license information allowing the playback of the content from the license server, and plays the content based on the license information; and a display unit which outputs the content that is played, wherein the transaction information includes transaction identification information to identify a corresponding transaction and user, and the license information includes a license file and a license key.

In the present invention, the device further includes a certification unit which checks whether a right to copy or move the content is present through a server when the content is copied or moved to other storage device by a user, wherein the controller copies or moves the content to the other storage device when, as a result of the check, the right to copy or move the content is present.

In the present invention, the controller determines whether the content is to be played or not based on level information of a playback device, and the function of the playback device corresponds to level information of the content.

MODE FOR INVENTION

Hereinafter, configurations and operations thereof in accordance with embodiments of the present invention are described with reference to the accompanying drawings. The configurations and operations of the present invention described with reference to the drawings are described as only embodiments, and the technical spirit and kernel configuration and operation of the present invention are not restricted by the configurations and operations.

Furthermore, common terms that are now widely used are selected as terms used in this specification, but in specific cases, terms randomly selected by the applicant are used. In this case, since the meaning of a corresponding term is clearly described in the detailed description of a corresponding part, the term should not be interpreted as being based on only the name of the term used in the description of this specification, but should be interpreted by checking even the meaning of the term.

FIG. 1 is an embodiment to which the present invention is applied and illustrates a system for using a secure high definition content service.

The system to which the present invention is applied may basically include a user 100 who purchases and uses secure high definition content, playback devices 200-1, 200-2, and 200-3 capable of playing the content, a storage device 300 in which the content has been stored or is capable of being stored, a content provider 400 which provides the content, a retailer 500 and/or an electronic kiosk 700 which is supplied with the content and provide the content to the user, a download server 600 which stores the content in order to download the content, and a license server 800 which provides license information that permits the playback of the content. Furthermore, the system may further include an external interface 900 for controlling the operation of the playback device, for example, a remote controller.

In an embodiment to which the present invention is applied, a user who tries to use a secure high definition content service may use the service using various methods. In this case, an example of secure high definition content may include secure content storage association (SCSA) content. Content described in this specification may include the SCSA content.

In a first example, the user 100 may use the service by purchasing the storage device in which the secure high definition content has already been stored. For example, the content provider 400 may preload content to be provided onto a hard disk drive (HDD), a portable hard drive, such as a solid state drive (SSD), or a flash memory product, such as a USB flash drive or an SD card, and may sell the content. The user 100 may use the service by purchasing the storage device in which required content has been stored.

In a second example, the user 100 may use the secure high definition content service by purchasing content from the retailer 500 who provides the secure high definition content service. For example, the retailer 500 may be provided with content from the content provider 400 and may provide a content service on online or on offline. The user 100 may use the service by legitimately purchasing content from the retailer 500. Furthermore, the user 100 may use the service by purchasing the storage device from the retailer 500.

In this case, the retailer 500 may provide the user 100 with transaction information corresponding to content purchase. In this case, the transaction information is indicative of information about content transaction activities, and may mean information about a set of right information. For example, the right information may denote information indicative of the state in which a license may be issued to the storage device. Furthermore, the transaction information may include transaction identification information to identify at least one of a corresponding transaction, seller, and user and right information indicative of the right information item of corresponding content. In this case, the transaction identification information may provide a unique like to a corresponding transaction.

In a third example, the user 100 may play secure high definition content by inserting the storage device 300 in which the secure high definition content has been stored into the playback device 200-1. For example, the playback device may be all devices capable of playing multimedia content, such as a mobile device, TV, a computer, a notebook, and a tablet PC.

In a fourth example, the user 100 may insert the storage device 300 in which secure high definition content has been stored or may be stored into a first playback device 200-1 and may play the content in a second playback device 200-2. In this case, the first playback device 200-1 and the second playback device 200-2 may have been connected over a network. The second playback device 200-2 may be automatically turned on when the storage device 300 is inserted into the first playback device 200-1. Furthermore, the playback of content in the second playback device 200-2 may be possible through an external interface (e.g., the remote controller 900) or a user interface (e.g., a touch screen, a voice, or a gesture).

In a fifth example, the user 100 may play secure high definition content by inserting the storage device 300 in which the content has been stored into the playback device 200-3 and downloading the content from an external content server. In this case, the content may be stored in the storage device 300, and the external content server may be the content server of the content provider 400 or the retailer 500.

In order to play secure high definition content, a specific application may be required. The specific application described in this specification may mean a software program for playing secure high definition content. For example, the specific application may mean a software program capable of playing anticopying high definition content which has been stored or may be stored in an HDD, a portable hard drive, such as an SSD, a flash memory product, such as a USB flash drive or an SD card.

In particular, in the case of a playback device incapable of playing secure high definition content, the installation of the specific application may be essential in order to play the content.

Figure 2:
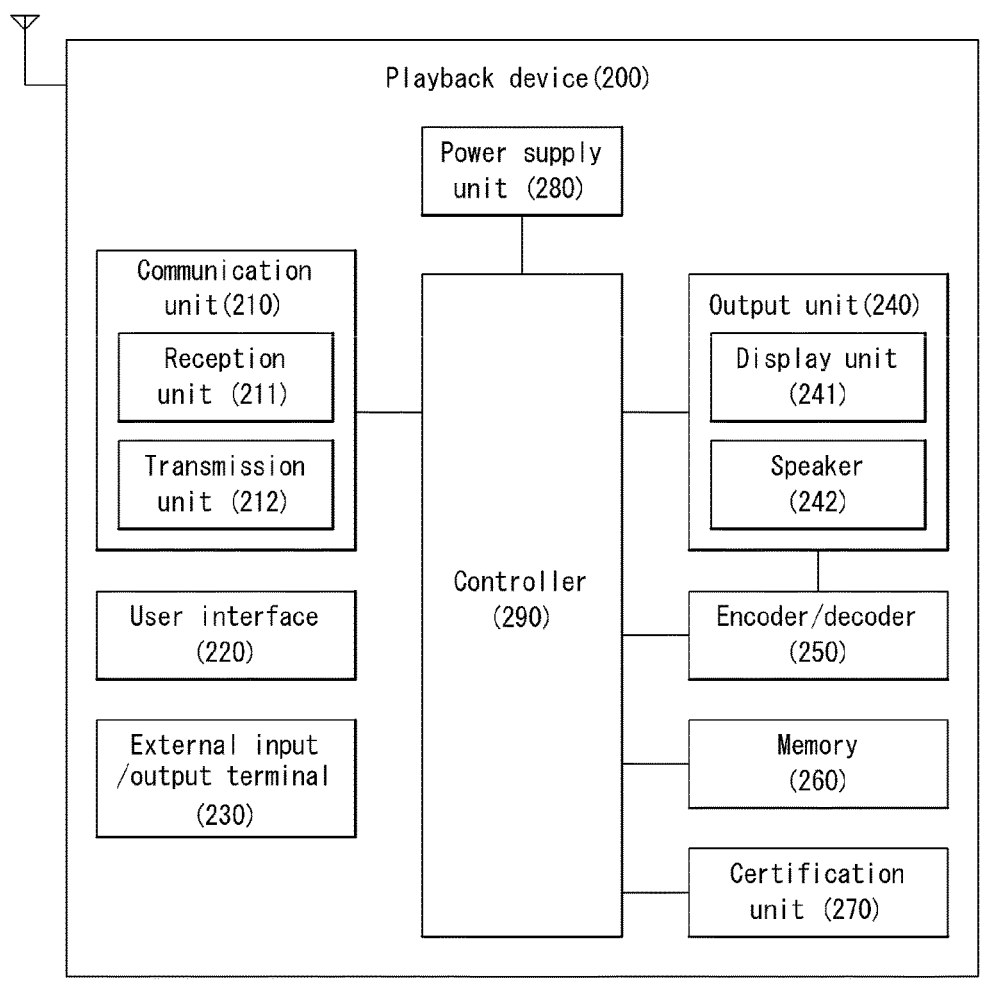
FIG. 2 is an embodiment to which the present invention is applied and shows a schematic internal block diagram of a playback device for playing secure high definition content.

FIG. 2 is an embodiment to which the present invention is applied and shows a schematic internal block diagram of a playback device for playing secure high definition content.

The playback device 200 may basically include a communication unit 210, a user interface 220, an external input/output terminal 230, an output unit 240, an encoder/decoder 250, memory 260, a certification unit 270, a power supply unit 280, and a controller 290. The communication unit 210 may include a reception unit 211 and a transmission unit 212, and the output unit 240 may include a display unit 241 and a speaker 242.

The communication unit 210 may include one or more modules which enable wired/wireless communication between the playback device 200 and a content server or between the playback device 200 and another electronic device connected to the playback device 200 over a network. For example, the reception unit 211 may receive a signal transmitted by the content server or another electronic device through a channel. In this case, the signal may include secure high definition content data. The transmission unit 212 may send information necessary to download or stream the secure high definition content data to the content server or another electronic device. For example, the information necessary to download or stream the secure high definition content data may include at least one of the identification information, transaction information, license information, level information, and device certificate information of the playback device and/or the storage device. In this case, the license information is indicative of information that permits the playback of purchased content. For example, the license information may include at least one of license file information and license key information.

The user interface 220 functions to transfer input information from a user to the playback device 200. For example, the user interface 220 may be used when the playback of the secure high definition content is controlled, information necessary for purchasing or an authentication procedure is inputted, or setting for playback in another electronic device is performed. The user interface 220 may include a touch screen unit (not shown), a voice recognition unit (not shown), or a gesture recognition unit (not shown), and may be a separate external device, such as a remote controller.

The external input/output terminal 230 functions as a passage to an external device connected to the playback device 200. The external input/output terminal 230 receives data from an external device or is supplied with power from an external device and transfers the power to each of the elements of the playback device 200 or enables data within the playback device 200 to be transmitted to an external device. For example, the external input/output terminal 230 may be indicative of a connection terminal for connection to the storage device 300. For a detailed example, the external input/output terminal 230 may include at least one of a USB port, an HDMI port, a wired/wireless headset port, an external charger port, a wired/wireless data port, a memory card port, an audio input/output (I/O) port, a video I/O port, and an earphone port. Communication between the storage device 300 and the playback device 200 may be performed through the external input/output terminal 230.

The output unit 240 functions to generate output related to the sense of sight and the sense of hearing, and may include the display unit 241 and the speaker 242.

The display unit 241 may output visual information processed by the playback device 200. For example, the display unit 241 may output secure high definition content, may output information indicating that the storage device 300 has been plugged in, or may output information required in a process of purchasing or certificating content. The display unit 241 may include at least one of a liquid crystal display, a thin film transistor liquid crystal display, an organic light-emitting diode, a flexible display, and a 3D display.

The speaker 242 may output auditory information processed by the playback device 200. For example, the speaker 242 may output audio information of content or may output information necessary for the playback of content in the form of voice information.

The encoder/decoder 250 may be used to decode the secure high definition content in order to display the secure high definition content or may be used to encode an image signal or audio signal received from the playback device 200.

The memory 260 may store a program for the operation of the controller 290 and may temporarily store inputted/output data. For example, the memory 260 may store a specific application for playing the secure high definition content and may store the identification information, profile information, level information, device certificate information, and metadata of the content of the playback device 200.

The memory 260 may include at least one type of a storage medium, including a flash memory type, a hard disk type, a multimedia card micro type, card type memory (e.g., SD or XD memory), random access memory (RAM), static random access memory (SRAM), read-only memory (ROM), electrically erasable programmable read-only memory (EEPROM), programmable read-only memory (PROM) magnetic memory, a magnetic disk, and an optical disk. Furthermore, the playback device 200 may operate in relation to a web storage which performs the storage function of the memory 260 on the Internet.

The certification unit 270 may decrypt encrypted content in order to play the content. In this case, the certification unit 270 may perform an acknowledgement process for key information and may send and receive the certificate information of the storage device or a playback device.

The power supply unit 280 is supplied with external power and/or internal power under the control of the controller 290 and supplies power necessary for the operation of each of the elements.

The controller 290 controls an overall operation of the playback device 200. For example, the controller 290 may control an operation of detecting the connection of the storage device 300, receiving device certificate information from the retrieved storage device, or sending the received device certificate information to a server. Furthermore, the controller 290 may control an operation of receiving an encrypted media file and a certificate revision list (CRL) from the server, storing the encrypted media file in the storage device, or updating the CRL based on the device certificate information, or playing the encrypted media file based on the updated CRL.

Figure 3:
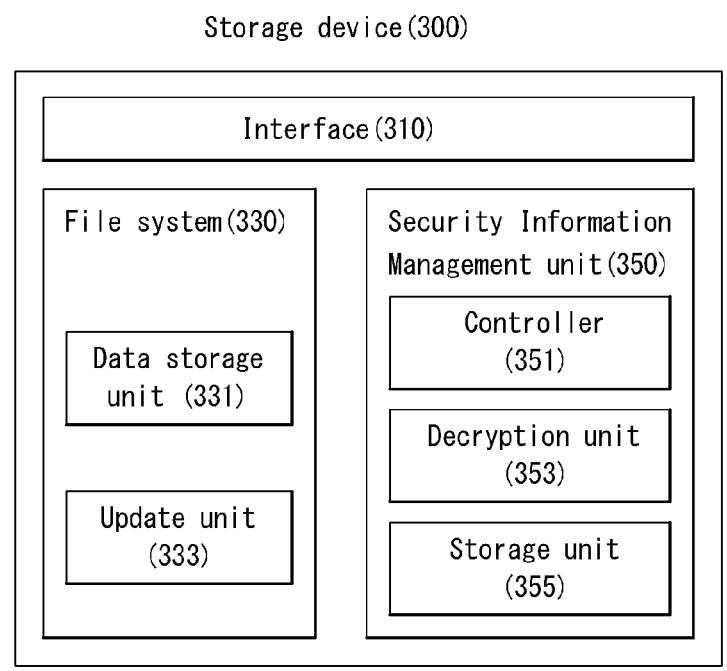
FIG. 3 is an embodiment to which the present invention is applied and shows a schematic internal block diagram of a storage device capable of storing secure high definition content.

FIG. 3 is an embodiment to which the present invention is applied and shows a schematic internal block diagram of the storage device capable of storing secure high definition content.

The storage device 300 to which the present invention is applied may basically include an interface 310, a file system 330, and a security information management unit 350. The file system 330 may include a data storage unit 331 and an update unit 333. The security information management unit 350 may include a controller 351, a decryption unit 353, and a storage unit 355.

The interface 310 functions as a passage to an external device connected to the storage device 300. For example, if the storage device 300 has been plugged in to the playback device, the storage device 300 receives data from the playback device through the interface 310 and sends data within the storage device 300 to the playback device through the interface 310.

The data storage unit 331 may store encrypted multimedia content data or license information, password information, and the latest CRL necessary to play the encrypted multimedia content data.

The update unit 333 may receive the latest CRL and perform update by synchronizing the latest CRL with a previously stored CRL. In this case, the latest CRL may be received from the playback device or an external server.

The security information management unit 350 may access the license server through the playback device and may perform a handshake process along with the license server with respect to license information, password information, and a CRL necessary for content playback. The controller 351 of the security information management unit 350 may control the above process, and the decryption unit 353 may decrypt the license information or the password information. Furthermore, the storage unit 355 may store the license information and/or the password information, and the storage unit 355 may be a security region within the storage device 300.

Figure 4:
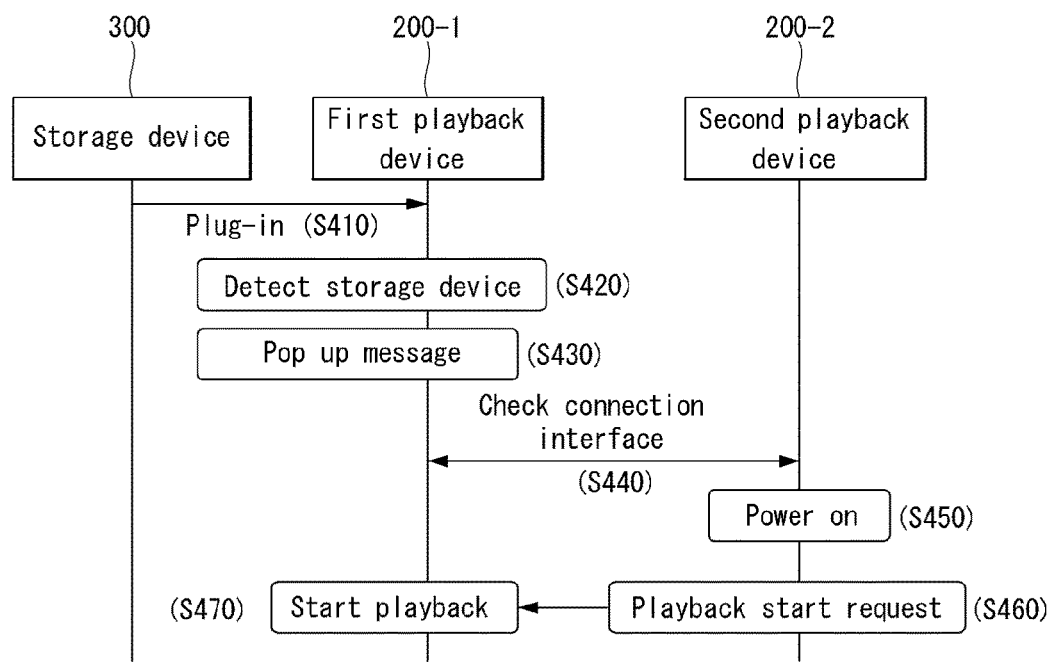
FIGS. 4 and 5 are embodiments to which the present invention is applied and are flowcharts illustrating a process of automatically turning on power of a second playback device when the storage device is inserted into a first playback device.
Figure 5:
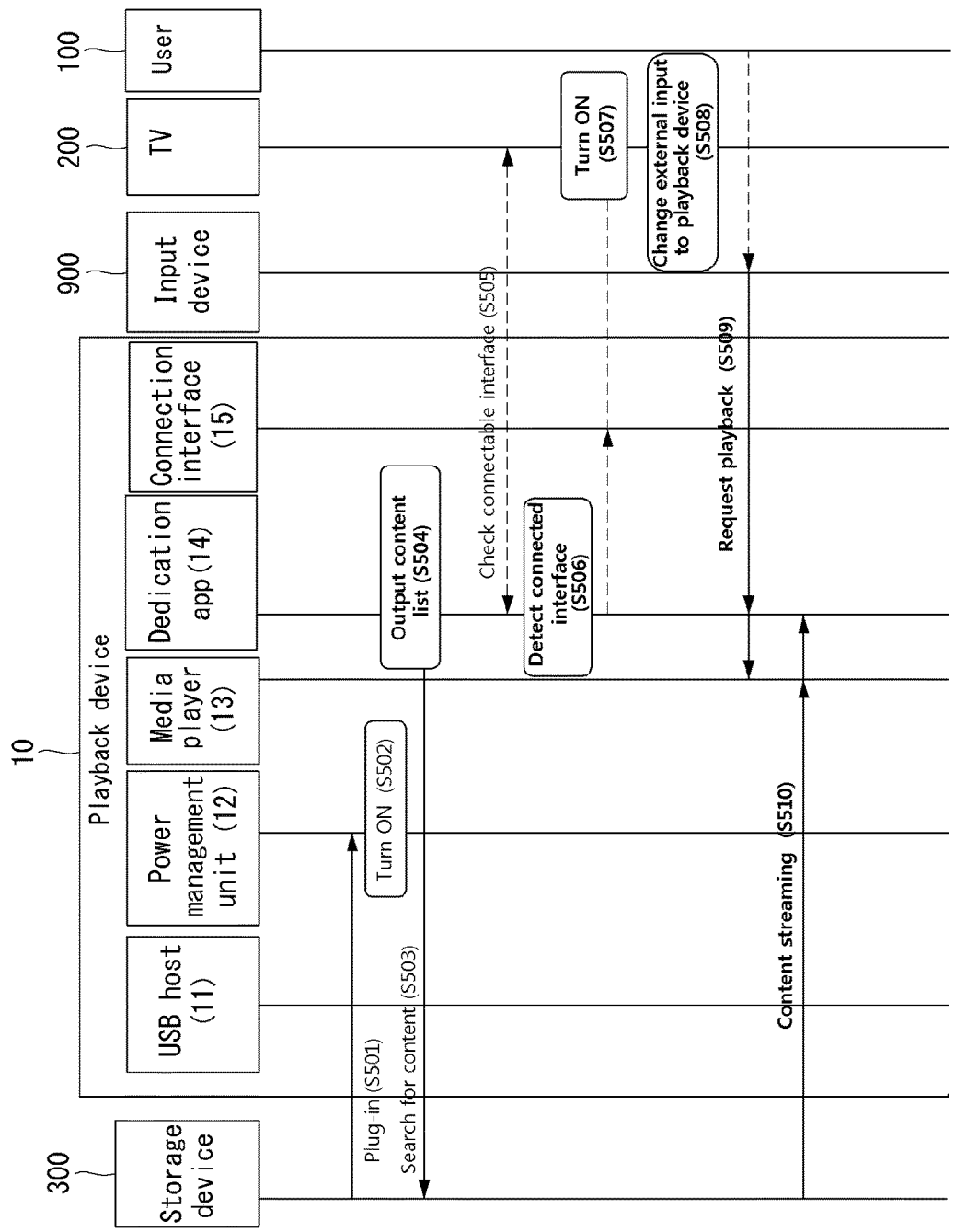

FIGS. 4 and 5 are embodiments to which the present invention is applied and are flowcharts illustrating a process of automatically turning on power of a second playback device when the storage device is inserted into a first playback device.

Referring to FIG. 4, first, when the storage device 300 in which secure high definition content has been stored is plugged in to the first playback device 200-1 at step S410, the first playback device 200-1 may automatically detect the plugged-in storage device and confirm the storage device 300 as a result of the detection at step S420.

When the first playback device 200-1 confirms the plug-in of the storage device 300, the first playback device 200-1 displays a message indicating that the storage device 300 has been plugged in, which may be output in a pop-up message form at step S430. Furthermore, the first playback device 200-1 may display a list of content included in the storage device 300 and may select content to be played through communication (media browse) with an input device.

Furthermore, when the first playback device 200-1 confirms the plug-in of the storage device 300, the first playback device 200-1 may identify another playback device connected thereto and confirms a connection interface with another playback device at step S440. For example, the first playback device 200-1 may be a media player, and the second playback device 200-2 may be TV. The first playback device 200-1 and the second playback device 200-2 may be connected through a wired/wireless interface, such as a high definition multimedia interface (HDMI), a wake-on-LAN, or Bluetooth.

When the first playback device 200-1 confirms the connection interface with the second playback device 200-2, power of the second playback device 200-2 may be automatically turn on at step S450. Furthermore, when the first playback device 200-1 requests the playback of corresponding content through the second playback device 200-2 at step S460, the first playback device 200-1 plays the content at step S470. In this case, the first playback device 200-1 may play the content in response to the playback start request of an external input device. The content may be selected from the displayed list of content list.

FIG. 5 is another embodiment describing a process of automatically turning on power of another playback device based on the internal elements of a playback device when the storage device is plugged in to the playback device.

The playback device 10 may include a USB host 11, a power management unit 12, a media player 13, a dedication app 14, and a connection interface.

First, when the storage device 300 in which secure high definition content has been stored is plugged in to the playback device 10 at step S501, the power management unit 12 of the playback device 10 may detect the plugged-in storage device. When the storage device is detected, the dedication app 14 of the playback device 10 may request a search for the content stored in the storage device at step S503 and output a list of the retrieved content at step S504.

When the playback device 10 confirms the plug-in of the storage device 300, the dedication app 14 of the playback device 10 may identify TV 200, that is, another playback device connected to the playback device 10 and may confirm a connection interface with the TV 200 at step S505.

When the playback device 10 detects the connection interface with the TV 200 at step S506, power of the TV 200 may be automatically turned on at step S507. Furthermore, the TV 200 may change external input to the playback device 10 at step S508.

When a user requests the media player 13 of the playback device 10 to play corresponding content or requests the playback of the corresponding content through the input device 900 at step S509, the playback device 10 may play the content by streaming the content from the storage device 300 at step S510.

Figure 6:
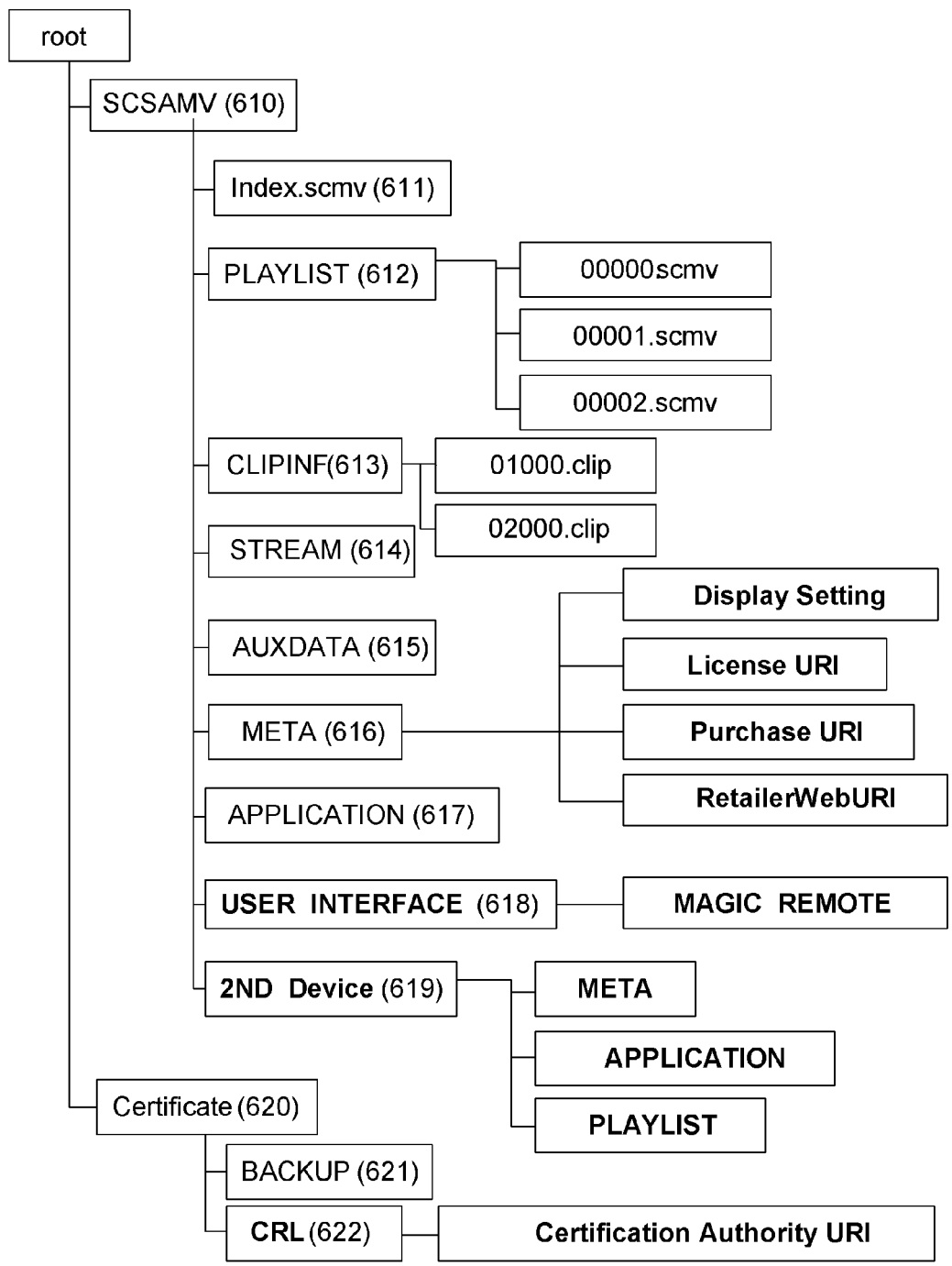
FIG. 6 is an embodiment to which the present invention is applied and shows a data directory structure for high definition content management to which the present invention is applied.

FIG. 6 is an embodiment to which the present invention is applied and shows a data directory structure for high definition content management to which the present invention is applied.

The data directory structure for high definition content management may be basically divided into a high definition content image directory 610 and a certificate directory 620 starting from a root directory.

The high definition content image directory 610 may include an index directory 611, a playback list directory 612, a clip directory 613, a stream directory 614, an additional data directory 615, a metadata directory 616, an application directory 617, a user interface directory 618, and a second device directory 619. The playback list directory 612 may include playback items, such as 00000.scmv, 00001.scmv, and 00002.scmv, for example. The clip directory 613 may include clip items, such as 01000.clip and 02000.clip, for example.

The metadata directory 616 may include information, such as display setting, a license uniform resource locator (URI), a purchasing place URI, and a retailer URI. For example, the metadata directory 616 may include movie advertisement information, retailer information, and display setting information. In this case, the movie advertisement information may include a license URI and a purchasing place URI. The retailer information may include a retailer name and a website URI. The display setting information may include brightness, contrast, gamma, frame rate, and color depth information according to display mode information (e.g., a movie, sports, a drama, and music).

The user interface directory 618 may include information about a separate external input device. The second device directory 619 may include the metadata of a second device, the application of the second device, and the playback list of the second device. For example, the metadata of the second device may include information, such as a clip name, a playback time, a director, and a player. The application of the second device may include information, such as a platform, a name, and an installation URI. The playback list of the second device may include information, such as a playback start time, a playback end time, an object type, an object file or an object address, information about the description of a corresponding object, and an execution command.

The certificate directory 620 may include a backup 621 and a CRL 622. The CRL 622 may include certificate right address information, playback device certificate information, and storage device certificate information.

FIG. 7 is an embodiment to which the present invention is applied and shows metadata provided in order to play the content of the storage device, inserted into a first playback device, in a second playback device.

The present embodiment illustrates an example metadata which may be provided by a second playback device when the storage device is plugged in to a first playback device and the second playback device attempts to play high definition content stored in the storage device.

Referring to FIG. 7, the metadata provided by the second playback device may include advertisement information 710, advertisement playback time information 720, and market information 730.

The advertisement information 710 may include at least one of target device information 711 indicative of a device that is the subject of output, category information 712 for classifying target markets, scope information 713 indicative of a provided limit scope, advertisement provider identification information (providerID) 714 for identifying an advertisement provider, advertisement identification information (ad_ID) 715 for identifying provided advertisements, and an update number or update information (updateNum) 716 indicative of version information.

The advertisement playback time information 720 may include at least one of start information 721 indicative of an advertisement start time and end information 722 indicative of an advertisement end time.

The market information 730 may include address information for a link to a target market.

Figure 8:
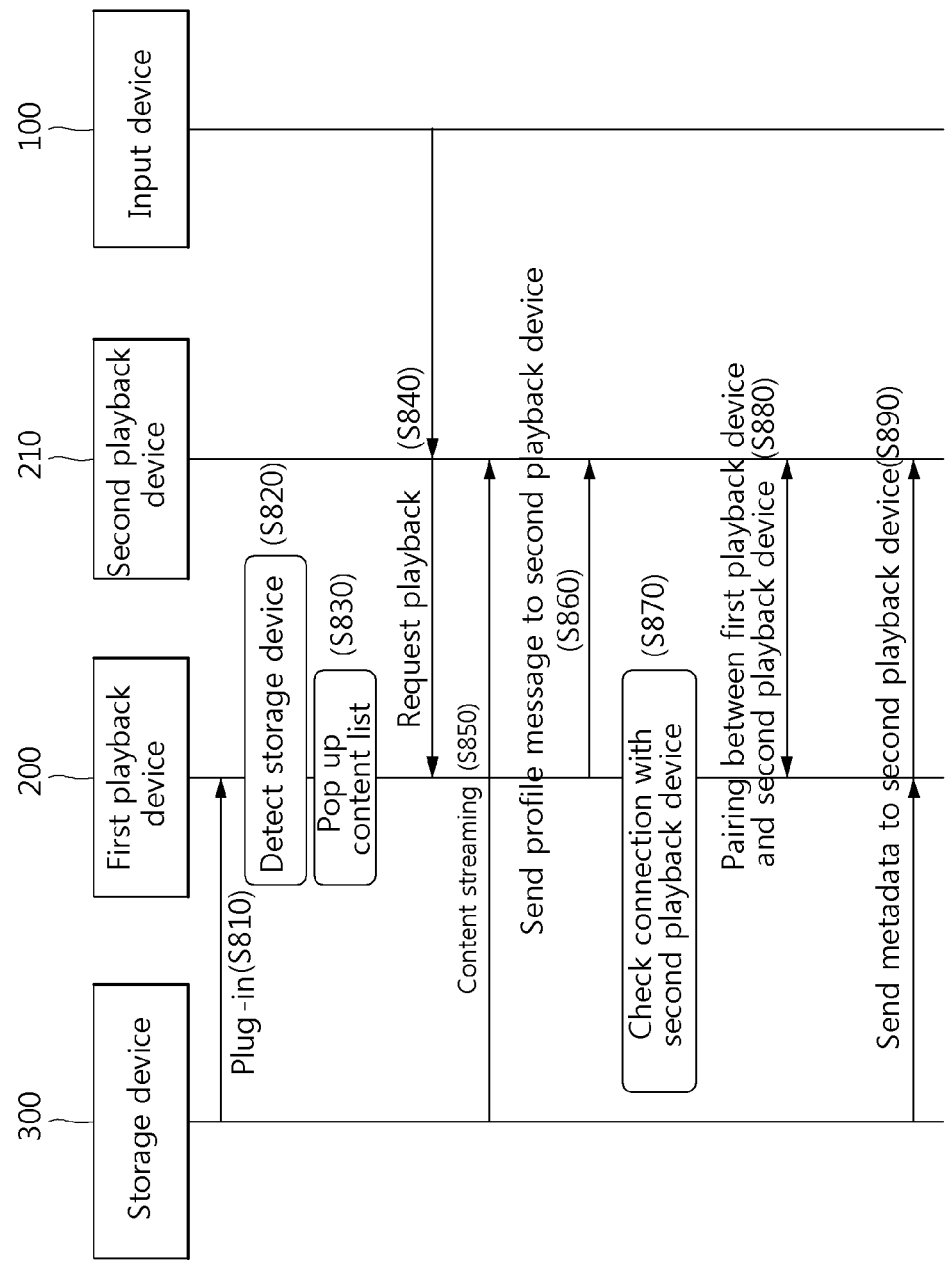
FIG. 8 is an embodiment to which the present invention is applied and is a flowchart illustrating a process of playing the content of the storage device, inserted into a first playback device, in a second playback device.

FIG. 8 is an embodiment to which the present invention is applied and is a flowchart illustrating a process of playing the content of the storage device, inserted into a first playback device, in a second playback device.

When a user watches high definition content, the user may check information about the corresponding high definition content using another playback device. To this end, a storage device in which the high definition content has been stored needs to have stored metadata, address information, and playback list information to be provided to another playback device therein. In this case, the embodiments described with reference to FIGS. 6 and 7 may be applied to the metadata.

Furthermore, if a user wants to check, in another playback device, information about high definition content that is now played, the user needs to perform pairing between a first playback device that now plays the high definition content and the second playback device from which the information about the high definition content is to be checked. For example, the pairing may be automatically performed if the first playback device and the second playback device are connected over a network. Furthermore, when the pairing between the two devices is completed, the information about the high definition content may be transmitted and output to the second playback device.

Referring to FIG. 8 which is an embodiment to which the present invention is applied, when the storage device 300 in which secure high definition content has been stored is plugged in to a first playback device 200 at step S810, the first playback device 200 may detect the plugged-in storage device and confirm the storage device 300 as a result of the detection at step S820.

When the first playback device 200 confirms the plug-in of the storage device 300, the first playback device 200 may output a message indicating that the storage device 300 has been plugged in, which may be output in a pop-up message form. Furthermore, the first playback device 200 may display a list of content included in the storage device 300 and may select content to be played through communication (media browse) with an input device 100.

When a playback request through the input device 100 is received at step S840, the first playback device 200 plays the content stored in the storage device 300 by streaming the content at step S850. In this case, data streamed from the storage device 300 may include a variety of types of information related to content playback in addition to the content. For example, the streamed data may include an AV stream, DRM information, content key information, security information, metadata (a content identifier, an audio language, an audio type, a title language, a title type, etc.), a link watch, policy information, and policy information for connection with another device. In this case, the policy information for connection with another device may be indicative of content profile information.

The first playback device 200 may send a profile message to a second playback device 210 at step S860 and check connection with the second playback device 210 at step S870. Pairing between the first playback device 200 and the second playback device 210 may be performed based on the profile message at step S880. When the pairing is completed, the second playback device 210 may receive metadata for the second playback device 210 from the storage device and output the received metadata at step S890.

Accordingly, a user can check information about high definition content that is now played in another playback device.

Figure 9:
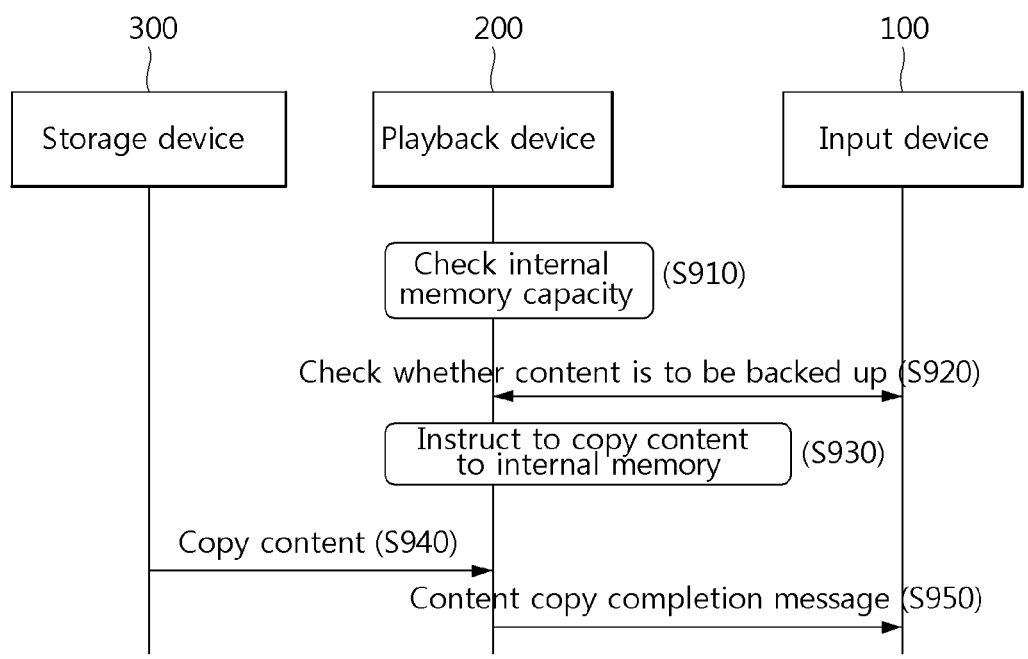
FIG. 9 is an embodiment to which the present invention is applied and is a flowchart illustrating a process of backing up secure high definition content stored in the storage device.

FIG. 9 is an embodiment to which the present invention is applied and is a flowchart illustrating a process of backing up secure high definition content stored in the storage device.

A user may back up high definition content that is being played in the repository of a playback device. Referring to FIG. 9, if high definition content stored in the storage device 300 is being played in the playback device 200 and a user wants to back up the played high definition content through an input device 100, first, the playback device 200 may check the capacity of internal memory at step S910.

For example, UHD TV may check whether its own HDD capacity is greater than the capacity of the high definition content and may request a user to check whether the content will be backed up if the HDD capacity is greater than the capacity of the high definition content at step S920.

If the user has requested the backup of the content through the input device 100, the playback device 200 may instruct the copy of the content to the internal memory at step S930. In response to the instruction, the dedication app of the playback device 200 may copy the high definition content stored in the storage device 300 to the HDD thereof at step S940. When the copy of the content is completed, the playback device 200 may output a content copy completion message at step S950.

Figure 10:
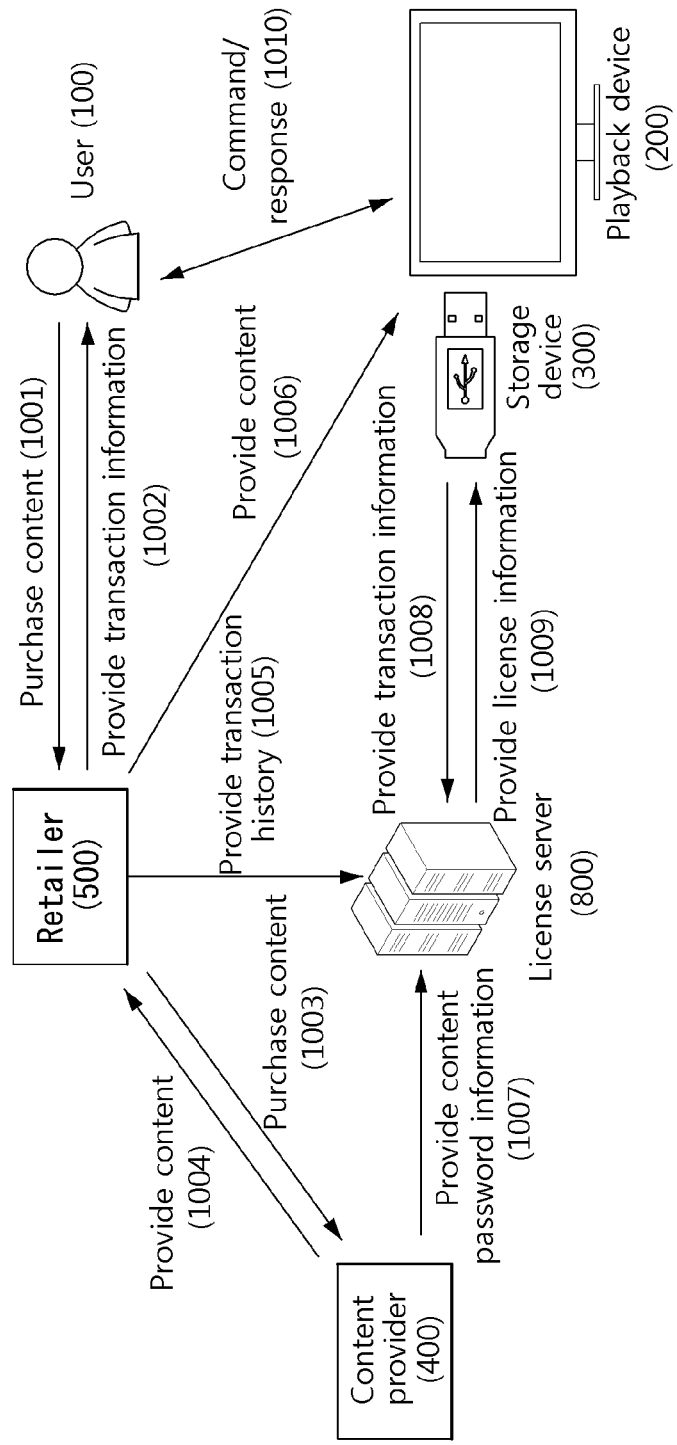
FIG. 10 is an embodiment to which the present invention is applied and shows the configuration of a network system for obtaining license information in order to play secure high definition content stored in the storage device.

FIG. 10 is an embodiment to which the present invention is applied and shows the configuration of a network system for obtaining license information in order to play secure high definition content stored in the storage device.

In order to purchase high definition content and play the content in a playback device, a user needs to obtain at least one of transaction information and license information corresponding to the high definition content. In this case, the transaction information is indicative of information about content transaction activities, and may be information about a set of right information. For example, the right information may be information indicative of the state in which a license may be issued to a storage device.

The transaction information may include transaction identification information to identify at least one of a corresponding transaction, seller, and user and right information indicative of right information items for corresponding content. In this case, the transaction identification information may provide a unique link to a corresponding transaction. Furthermore, the license information is indicative of information that permits the playback of purchased content and may include at least one of license file information and license key information, for example.

In the present embodiment, a process of obtaining license information in order to play high definition content is described.

Referring to FIG. 10, the user 100 may purchase secure high definition content from the retailer 500 (1001). In the present embodiment, the retailer 500 has been described as an example, and content may be purchased through another root or another content owner, for example, through the content provider 400 or another user.

Furthermore, the retailer 500 may also request content purchase from the content provider 400 or another retailer 500 (1003) and may be provided with the content from the content provider 400 or another retailer 500 (1004).

The retailer 500 who has received a purchase request from the user 100 may assign a right to play the high definition content to the user by generating transaction information in the license server 800. For example, the retailer 500 may provide the user 100 with the transaction information (1002) and may provide the license server 800 with a transaction history (1005). In this case, the provided transaction information may be stored in the storage device 300, and may correspond to a single piece of high definition content. The high definition content may be provided as a plurality of versions of content and may be provided as at least one of SD-level content, HD-level content, and UHD-level content, for example. Furthermore, the retailer 500 may provide the storage device 300 with the high definition content (1006).

The license server 800 may include data and an interface necessary to determine whether the storage device has a right to play content. The license server 800 may receive the transaction history from the retailer 500, may receive content password information from the content provider 400 (1007), and may receive the transaction information from the storage device 300 (1008).

The license server 800 may generate transaction information based on the transaction history. Furthermore, the transaction information may be generated by the retailer 500.

The user 100 may request the playback device 200 to play the purchased high definition content through an interface. In this case, the transaction information stored in the storage device 300 may be sent to the license server 800, and the license server 800 may check a playback right based on the transaction information. If the playback device 200 is found to have a playback right, the license server 800 may generate right information and license information and send them to the storage device 300 (1009). In this case, the license information is indicative of information that permits the playback of the purchased content, and may include at least one of license file information and license key information.

The storage device 300 that has received the right information and the license information may play the high definition content.

Figure 11:
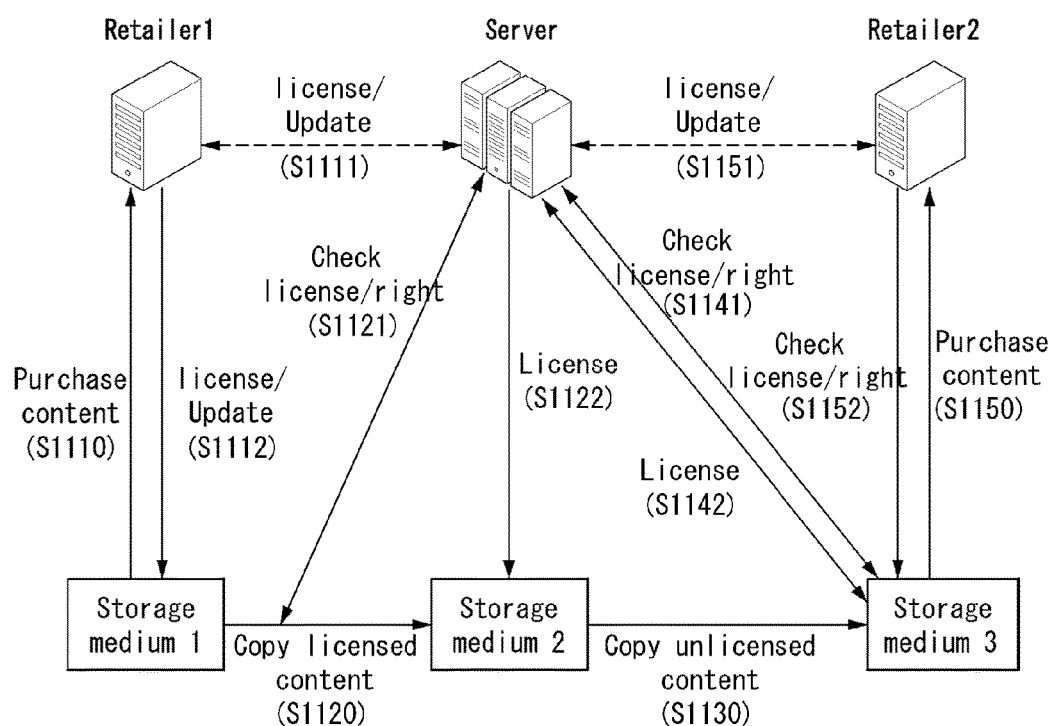
FIG. 11 is an embodiment to which the present invention is applied and is a flowchart illustrating the licensed copy and unlicensed copy process of secure high definition content between storage devices.

FIG. 11 is an embodiment to which the present invention is applied and is a flowchart illustrating the licensed copy and unlicensed copy process of secure high definition content between storage devices.

Secure high definition content may be copied or moved from one storage device to the other storage device. In this case, the license server may assign a right for valid copy or move.

First, when a storage medium 1 purchases secure high definition content from a retailer1 at step S1110, the retailer1 may report the contents of the content purchase to a server. In this case, the server may mean the license server. The server may provide the retailer1 with a valid license for the content purchase and update a CRL stored in the server at step S1111. In this case, the CRL may include at least one of a content title CRL, a storage device CRL, a playback device CRL, and a license CRL.

Furthermore, the retailer1 may provide the storage medium 1 with a valid license for the content purchase and update the CRL stored in the retailer1 at step S1112.

In another embodiment, if the storage medium 1 attempts to copy legitimately purchased content to a storage medium 2 using a playback device at step S1120, the server may check whether the storage medium 2 has a right to play the content or whether the content may be copied to the storage medium 2 at step S1121. If, as a result of the check, the storage medium 2 has a right to play the content or the content is able to be copied to the storage medium 2, the copy of the content to the storage medium 2 is performed, and the server may assign license information capable of playing the content to the storage medium 2 at step S1122. In this case, the storage medium 2 needs to have the capability capable of playing the content.

In another embodiment, if the storage medium 2 attempts to perform the unlicensed copy of the content to a storage medium 3 using another playback device, only the data file of the content is copied from the storage medium 2 to the storage medium 3, but a certification procedure through the server is not performed at step S1130. In this case, if the storage medium 3 attempts to play the content, a new license may need to be issued.

In yet another embodiment, if the storage medium 3 attempts to play the content, the storage medium 3 may request the server to assign a right to play the content thereto at step S1141. In response to the request, the server may assign the right to play the content to the storage medium 3 at step S1142.

However, if the content playback right has been fully exhausted, the storage medium 3 needs to newly purchase content from a retailer2 at step S1150. If the new content purchase through the retailer2 is completed, the retailer2 may send new purchase information to the server, and the server may update a CRL stored in the server based on the new purchase information at step S1151. Furthermore, the retailer2 may provide the storage medium 3 with a valid license for the content purchase and update a CRL stored in the retailer2 at step S1152.

Figure 12:
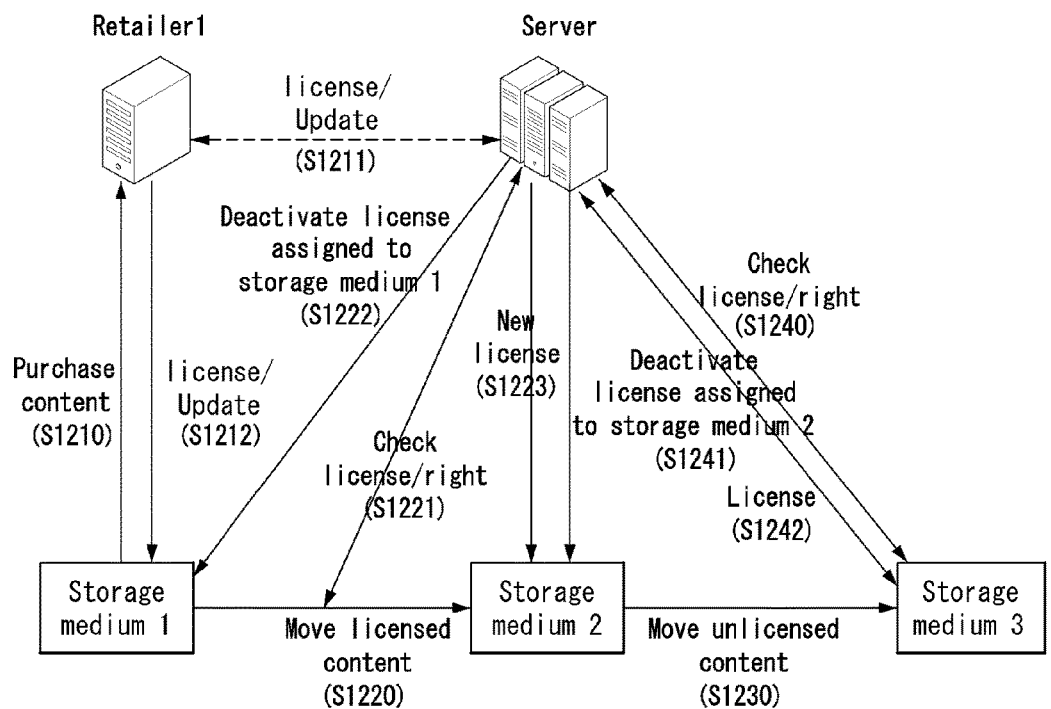
FIG. 12 is an embodiment to which the present invention is applied and is a flowchart illustrating the licensed move and unlicensed move process of secure high definition content between storage devices.

FIG. 12 is an embodiment to which the present invention is applied and is a flowchart illustrating the licensed move and unlicensed move process of secure high definition content between storage devices.

Secure high definition content may be moved from one storage device to the other storage device. In this case, "move" may mean that a content file is transferred to a destination storage medium having an activated license. The move may be performed by a playback device having the capability of playing the secure high definition content. The destination storage media may need to be able to store the secure high definition content. In this case, a server may assign a right for valid move.

First, when a storage medium 1 purchases secure high definition content from a retailer1 at step S1210, the retailer1 may report the contents of the content purchase to a server. The server may provide the retailer1 with a valid license for the content purchase and may update a CRL stored in the server at step S1211. In this case, the CRL may include at least one of a content title CRL, a storage device CRL, a playback device CRL, and a license CRL.

Furthermore, the retailer1 provides the storage medium 1 with a valid license for the content purchase and may update a CRL stored in the retailer1 at step S1212.

In another embodiment, if the storage medium 1 attempts to move legitimately purchased content to a storage medium 2 using a playback device at step S1220, the server may check whether the storage medium 2 has a right to play the content or whether the content can be moved at step S1221. If, as a result of the check, the storage medium 2 has a right to play the content or the content can be moved, the move of the content to the storage medium 2 may be performed. The server may deactivate the license assigned to the storage medium 1 at step S1222 and assign new license information capable of playing the content to the storage medium 2 at step S1223.

In another embodiment, if the storage medium 2 attempts to perform the unlicensed move of the content to a storage medium 3 using another playback device at step S1230, only the data file of the content is moved from the storage medium 2 to the storage medium 3, but a certification procedure through the server is not performed. In this case, if the storage medium 3 is to play the content, a new license may need to be issued.

In yet another embodiment, if the storage medium 3 is to play the content, the storage medium 3 may request the server to assign a right to play the content at step S1240. Accordingly, the server may deactivate the license assigned to the storage medium 2 at step S1241 and may assign new license information capable of playing the content to the storage medium 3 at step S1242.

Figure 13:
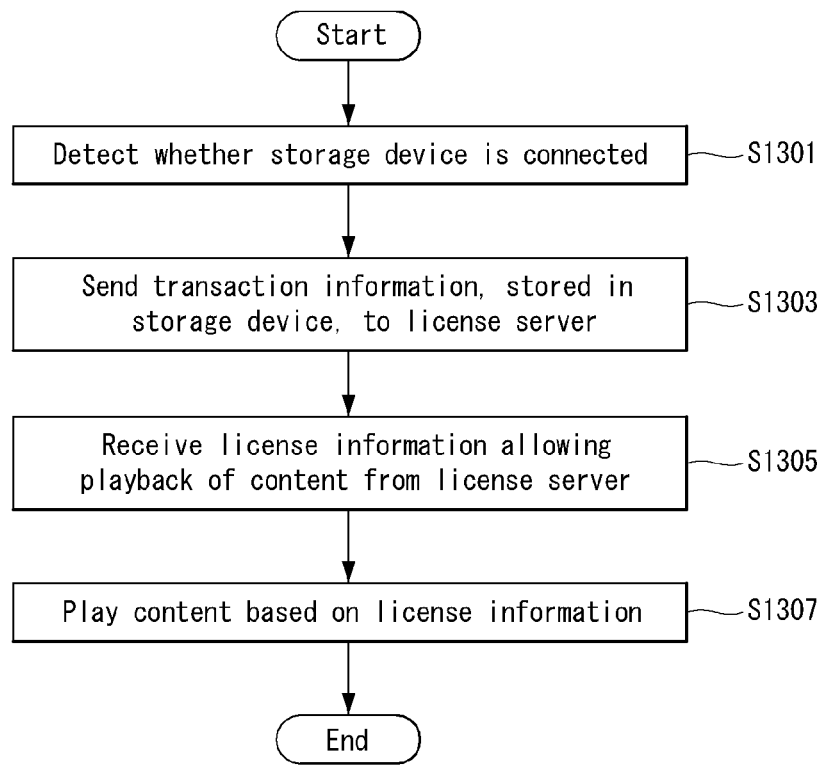
FIG. 13 is an embodiment to which the present invention is applied and is a flowchart illustrating a process of obtaining license information in order to play secure high definition content stored in the storage device.

FIG. 13 is an embodiment to which the present invention is applied and is a flowchart illustrating a process of obtaining license information in order to play secure high definition content stored in the storage device.

In order to purchase high definition content and play it in a playback device, a user needs to obtain at least one of transaction information and license information corresponding to the high definition content.

First, when the storage device in which secure high definition content has been stored is plugged in to the playback device, the playback device may detect the plugged-in storage device at step S1301. When the storage device is detected, the playback device may send transaction information, stored in the storage device, to the license server at step S1303. In this case, the transaction information is indicative of information about content transaction activities, and may mean information about a set of right information. For example, the right information may be information indicative of the state in which a license is able to be issued to the storage device. The transaction information may include transaction identification information to identify at least one of a corresponding transaction, seller, and user and right information indicative of the right information items of corresponding content. In this case, the transaction identification information may provide a unique link to a corresponding transaction.

The license server which has received the transaction information may check a playback right based on the transaction information. If it is found that the storage device has a right to play the high definition content, the license server may generate right information and license information and send them to the storage device at step S1305. In this case, the license information is indicative of information that permits the playback of the purchased content, and may include at least one of license file information and license key information.

The playback device may play the high definition content based on at least one of the right information and the license information at step S1307.

Figure 14:
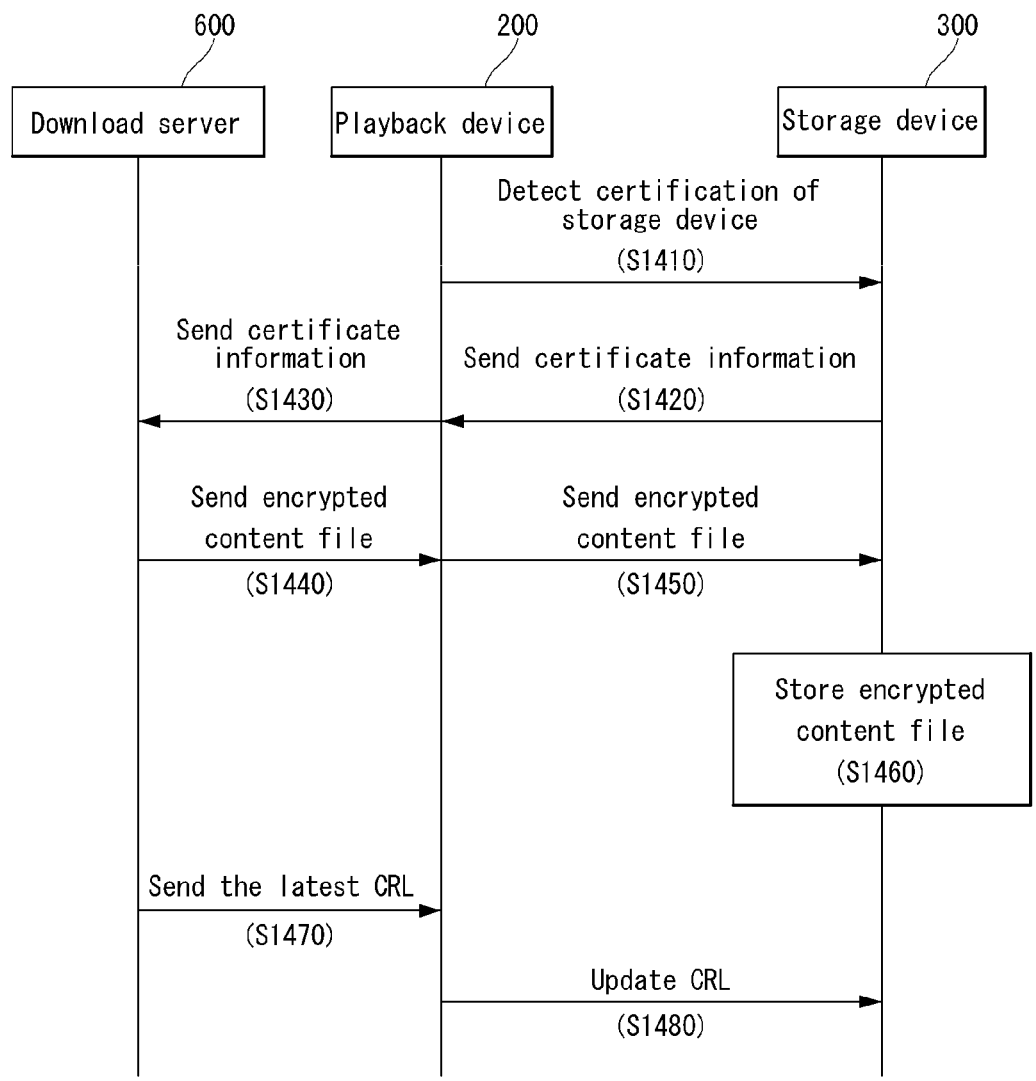
FIG. 14 is an embodiment to which the present invention is applied and is a flowchart illustrating an authentication procedure for playing secure high definition content.

FIG. 14 is an embodiment to which the present invention is applied and is a flowchart illustrating an authentication procedure for playing secure high definition content.

In order to play secure high definition content, the playback device 200 may use at least one of a CRL, password information, device identification information, device certificate information, storage device certificate information, and storage device identification information.

First, when the storage device 300 in which secure high definition content has been stored is plugged in to the playback device 200, the playback device 200 may request device certificate information about the storage device 300 from the storage device 300 at step S1410. When the request for the device certificate information is received from the playback device 200, the storage device 300 sends the device certificate information to the playback device 200 at step S1420, and the playback device 200 sends the device certificate information to the download server 600 at step S1430. In this case, the download server 600 is indicative of a server in which a content file has been stored. The download server 600 may include a certification server (not shown) for performing content certification, storage device certification, or playback device certification.

The download server 600 may receive the device certificate information of the storage device 300 and determine whether the device certificate information is valid. For example, the download server 600 may determine whether the device certificate information of the storage device 300 is valid by checking whether the device certificate information is identical with any one of pieces of device certificate information managed by the download server 600. If, as a result of the determination, the device certificate information of the storage device 300 is not valid, the playback device 200 may not play the secure high definition content.

In contrast, if, as a result of the determination, the device certificate information of the storage device 300 is valid, the download server 600 sends an encrypted content file to the playback device 200 at step S1440, and the playback device 200 sends the encrypted content file to the storage device 300 at step S1450.

The storage device 300 may store the encrypted content file. In this case, the received encrypted content file may be stored in a file system within the storage device 300 at step S1460.

The download server 600 sends the latest CRL to the playback device 200 along with the transmission of the encrypted content file at step S1470. The playback device 200 sends the latest CRL to the storage device 300. The storage device 300 receives the latest CRL and updates a previously stored CRL by synchronizing the received latest CRL with the previously stored CRL at step S1480. In this case, the CRL is indicative of a list of pieces of device certificate information necessary to play secure high definition content. For example, the CRL may include at least one of a content title CRL, a storage device CRL, a playback device CRL, and a license CRL. The CRL may be used to certificate the proper qualification of at least one of a playback device, a storage device, and a server and may be stored in the security region of the storage device.

Since the CRL within the storage device 300 is updated as described above, a secure session between the storage device 300 and the playback device 200 or between the storage device 300 and the download server 600 may be generated. Pieces of security information, such as a license key, may be transmitted and received through the secure session.

Accordingly, the playback device 200 may play the encrypted content file stored in the storage device 300 based on the update of the CRL. The encrypted content file may be played based on a specific application installed in the playback device 200.

Figure 15:
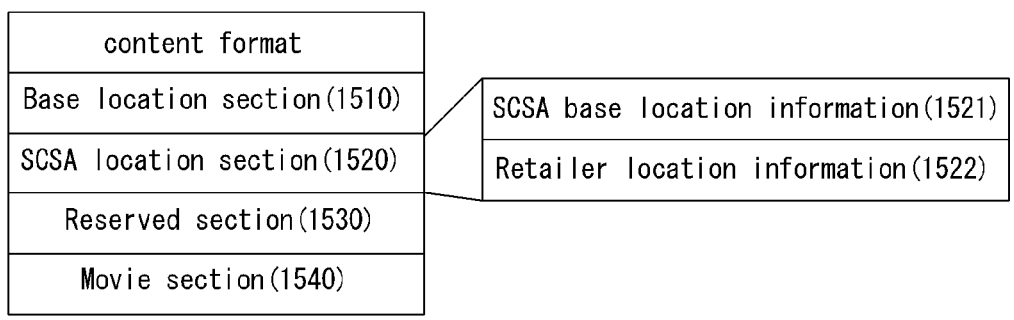

FIGS. 15 and 16 are embodiments to which the present invention is applied and show the formats of high definition content to which the present invention is applied.

The format of high definition content to which the present invention is applied may be applied to a digital entertainment content ecosystem (DECE) file format or extension thereof.

Referring to FIG. 15, the format of high definition content to which the present invention is applied may include a base location section 1510, an SCSA location section 1520, reserved section 1530, and a movie section 1540. The SCSA location section 1520 may include SCSA base location information 1521 and retailer location information 1522.

The sections may be present in the header of the high definition content format or may be present in an extension of a DECE file format. In this case, the sections may be placed based on the aforementioned sequence.

The SCSA base location information 1521 is indicative of license server address information for executing a license, and the retailer location retailer location information 1522 is indicative of retailer address information for the management of rights related to the high definition content file.

The reserved section 1530 may mean a reserved region for future use.

The movie section 1540 may include the image data of the high definition content.

Referring to FIG. 16, the format of high definition content to which the present invention is applied may include at least one of a location section 1610, an asset information section 1620, and a metadata section 1630.

The location section 1610 may include at least one of license server location information 1611, retailer location information 1612, and other information 1613. The asset information section 1620 may include at least one of security level information 1621, media profile information 1622, and asset identification information 1623. The metadata section 1630 may include at least one of metadata key identification information 1631, sample number information 1632, and size information 1633.

The license server location information 1611 may be information indicative of the location of a license server. The retailer location information 1612 may be information indicative of the location of a retailer. The other information 1613 may be indicative of information about the sub-domain of a retailer or a reserved region for future use.

The security level information 1621 may be indicative of information about the security level of high definition content. The media profile information 1622 may be indicative of information about the version of a media profile. The asset identification information 1623 may be indicative of information about the identification of high definition content.

The metadata key identification information 1631 is indicative of key identification information for decrypting encrypted metadata. The sample number information 1632 is indicative of the number of potential change samples. The size information 1633 is indicative of the capacity of a metadata segment.

In another embodiment to which the present invention is applied, a media file structure for storing a license file for playing high definition content is described.

The media file structure may include a protection system-specific header section. In this case, a specific header section of the protection system may include a movie section or a movie part section. In this case, a system identification information field within the specific header section of the protection system may be matched with the system identification information of the system for providing high definition content described in this specification. Furthermore, key identification information related to a sample may be matched with any one of pieces of key identification information within the specific header section of the protection system.

FIG. 17 is an embodiment to which the present invention is applied and shows the levels of high definition content to which the present invention is applied and the levels of a playback device using the levels of high definition content.

High-definition content to which the present invention is applied may include content level information 1710. The content level information 1710 is indicative of categorized content attribute information. Content provided by the system to which the present invention is applied may be provided in a different profile form depending on the content level information 1710. For example, if the content level information 1710 is indicative of "Level 1", corresponding content may correspond to a standard definition profile. If the content level information 1710 is indicative of "Level 2", corresponding content may correspond to a high definition profile. If the content level information 1710 is indicative of "Level 3", corresponding content may correspond to a quad high definition (QHD) profile. The content level information 1710 may include video profile information 1711 and audio profile information 1713.

For example, if the content level information 1710 is indicative of "Level 1", the video profile information 1711 of corresponding content may correspond to H.264 codec, a first profile (an L3 profile, etc.), and definition (480p). If the content level information 1710 is indicative of "Level 2", the video profile information 1711 of corresponding content may correspond to H.264 codec, a second profile (a high profile, etc.), and definition (720p, 1080p). If the content level information 1710 is indicative of "Level 3", the video profile information 1711 of corresponding content may correspond to H.265 codec, a third profile (a main profile, etc.), and definition (1440p). Furthermore, the audio profile information 1713 may correspond to a first profile (an AAC codec, etc.), a second profile (an HE-AAC codec), and a third profile (MPS, USAC, etc.).

A playback device which plays high definition content may also be provided in various levels depending on device capabilities. For example, whether or not to play high definition content may be determined based on a device level. That is, the playback device is unable to play content having higher content level information than the device level information of the playback device. For a detailed example, if device level information is indicative of "Level 1", a corresponding playback device may play content corresponding to the content level information "Level 1." If device level information is indicative of "Level 2", a corresponding playback device may play content corresponding to the content level information "Level 1" and "Level 2." If device level information is indicative of "Level 3", a corresponding playback device may play content corresponding to all content level information.

For another example, whether or not to apply the playback function of high definition content may be determined based on a device level. In this case, the playback function may include content playback, copy, move, or deletion. That is, a playback device is unable to perform the playback function on content having higher content level information than its own device level information.

Figure 18:
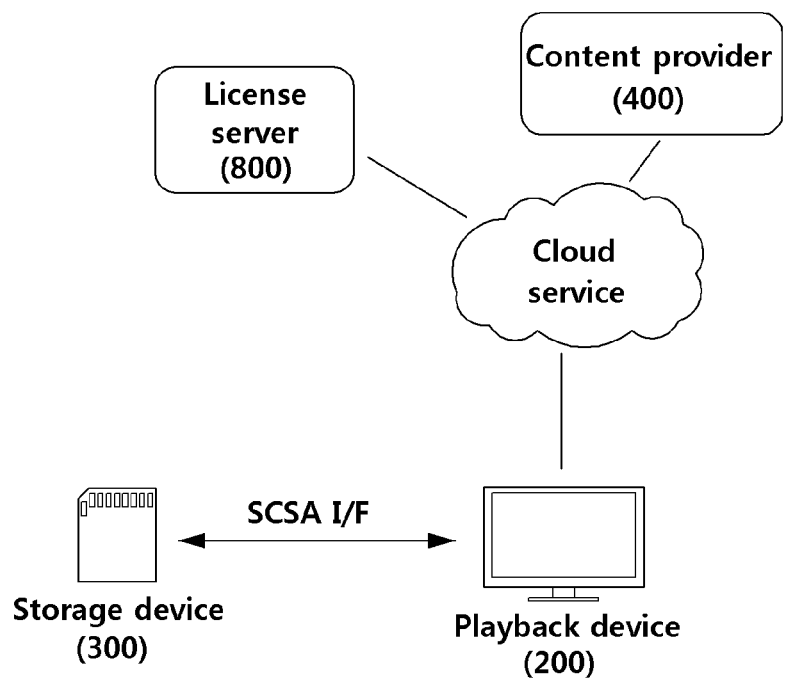
FIGS. 18 and 19 are embodiments to which the present invention is applied and illustrates system architecture and method for providing secure high definition content through a cloud service.
Figure 19:
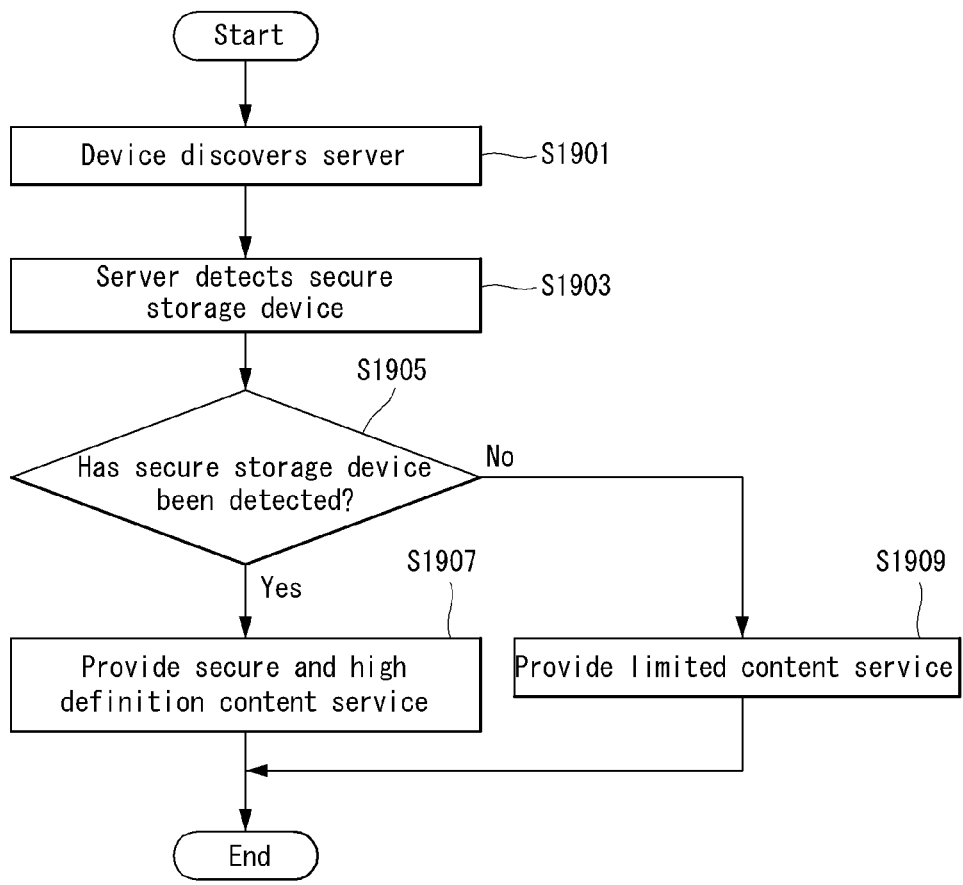

FIGS. 18 and 19 are embodiments to which the present invention is applied and illustrates system architecture and method for providing secure high definition content through a cloud service.

Secure high definition content to which the present invention is applied may be downloaded through cloud. In this case, license information for playing the high definition content may be downloaded from a license server.

For example, in relation to the supply of the high definition content, a user may be provided with the high definition content through a cloud service. In this case, the content provider 400 may provide the high definition content to the user through a cloud service.

Furthermore, the license server may provide the user with license information necessary to play the high definition content through a cloud service.

Referring to FIG. 19, a playback device may discover a download server or a license server through the search of a server at step S1901. In this case, the server may detect a secure storage device plugged in to the playback device at step S1903.

Whether or not to provide high definition content service may be determined depending on whether the server has detected a secure storage device at step S1905. For example, if the server has detected a secure storage device, the server may provide content to the storage device or may provide license information to the storage device through a cloud service at step S1907. If the server has not detected a secure storage device, however, the server may provide limited content to the storage device or may provide limited license information to the storage device through a cloud service or may not provide a high definition content service at step S1909.

Figure 20:
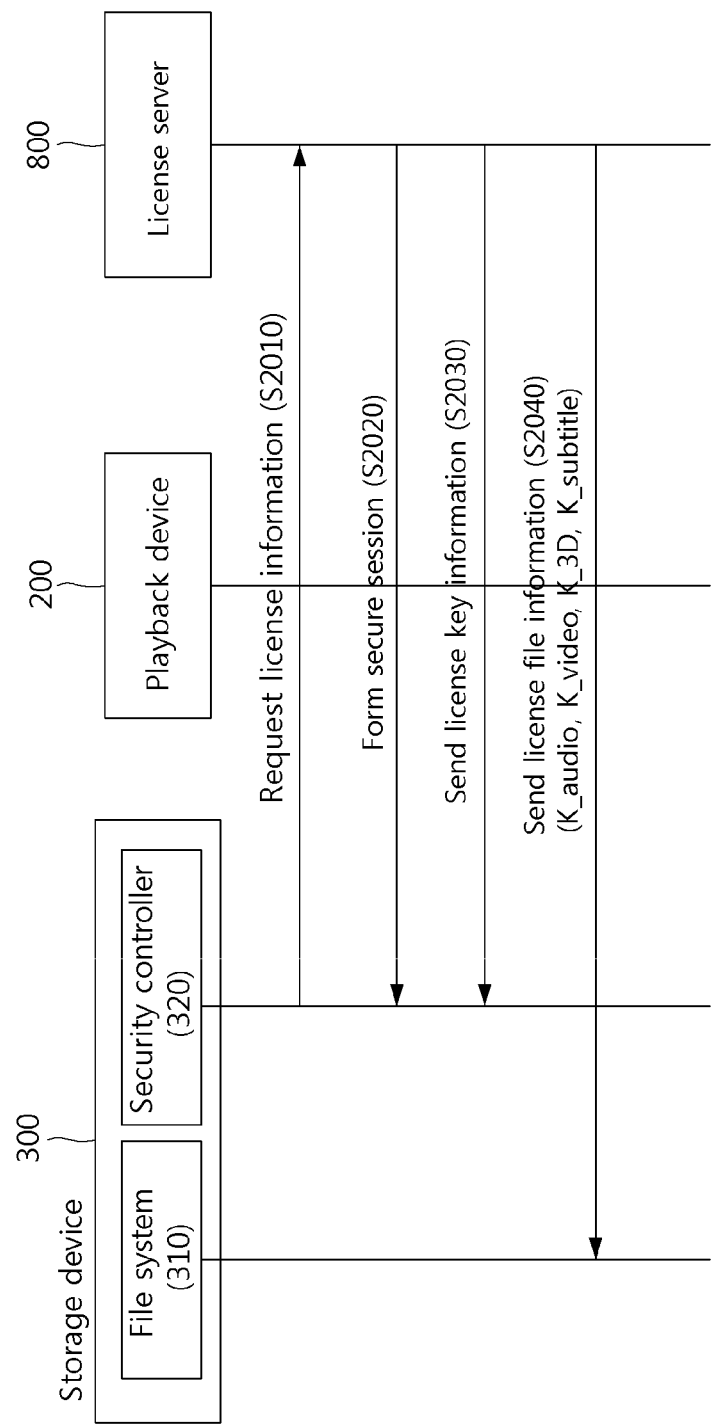
FIG. 20 is an embodiment to which the present invention is applied and is a flowchart illustrating a process of obtaining license information in order to play secure high definition content stored in the storage device.

FIG. 20 is an embodiment to which the present invention is applied and is a flowchart illustrating a process of obtaining license information in order to play secure high definition content stored in the storage device.

A user may purchase secure high definition content and needs to be supplied with license information from the license server 800 in order to play the purchased high definition content.

If the user has purchased the high definition content, the user may be supplied with transaction information from a seller, and the supplied transaction information may be stored in the storage device 300. In this case, the storage device 300 may include a file system 310 and a security controller 320.

The file system 310 may store encrypted high definition content and license information, password information, and the latest CRL necessary to play the encrypted high definition content.

The security controller 320 may access the license server 800 through the playback device 200 and performs a handshake process with the license server on the license information, the password information, and the CRL necessary for content playback.

Referring to FIG. 20, the security controller 320 may access the license server 800 through the playback device 200 and request license information at step S2010. The license server 800 that has requested the license information forms a secure session along with the security controller 320 at step S2020.

When the secure session is formed, the license server 800 may send the license information through the secure session. For example, the license server 800 may send license key information to the security controller 320 at step S2030 and send license file information to the file system 310 at step S2040.

In this case, the license key information or the license file information may include at least one of video key information, audio key information, specific key information, and metadata key information. In this case, the specific key information may be used to descrypt a specific part of a sample.

In another embodiment to which the present invention is applied, the license server may generate a license file. The license server may receive the shadow key of a playback device from the playback device. The license server may encrypt video key information K1_video and audio key information K1_audio using the shadow key. In the case of the encryption, common key information common to all playback devices may be used.

The license server may generate a shadow key using license key information stored in the storage device. The license server may generate re-encrypted video key information K2_video and audio key information K2_audio by encrypting the encrypted video key information K1_video and audio key information K1_audio again using the generated shadow key. The license server may encrypt re-re-encrypted video key information K1_video and audio key information K1_audio by encrypting the re-encrypted video key information K1_video and audio key information K1_audio again. The license server may generate a license file through such the above process.

Figure 21:
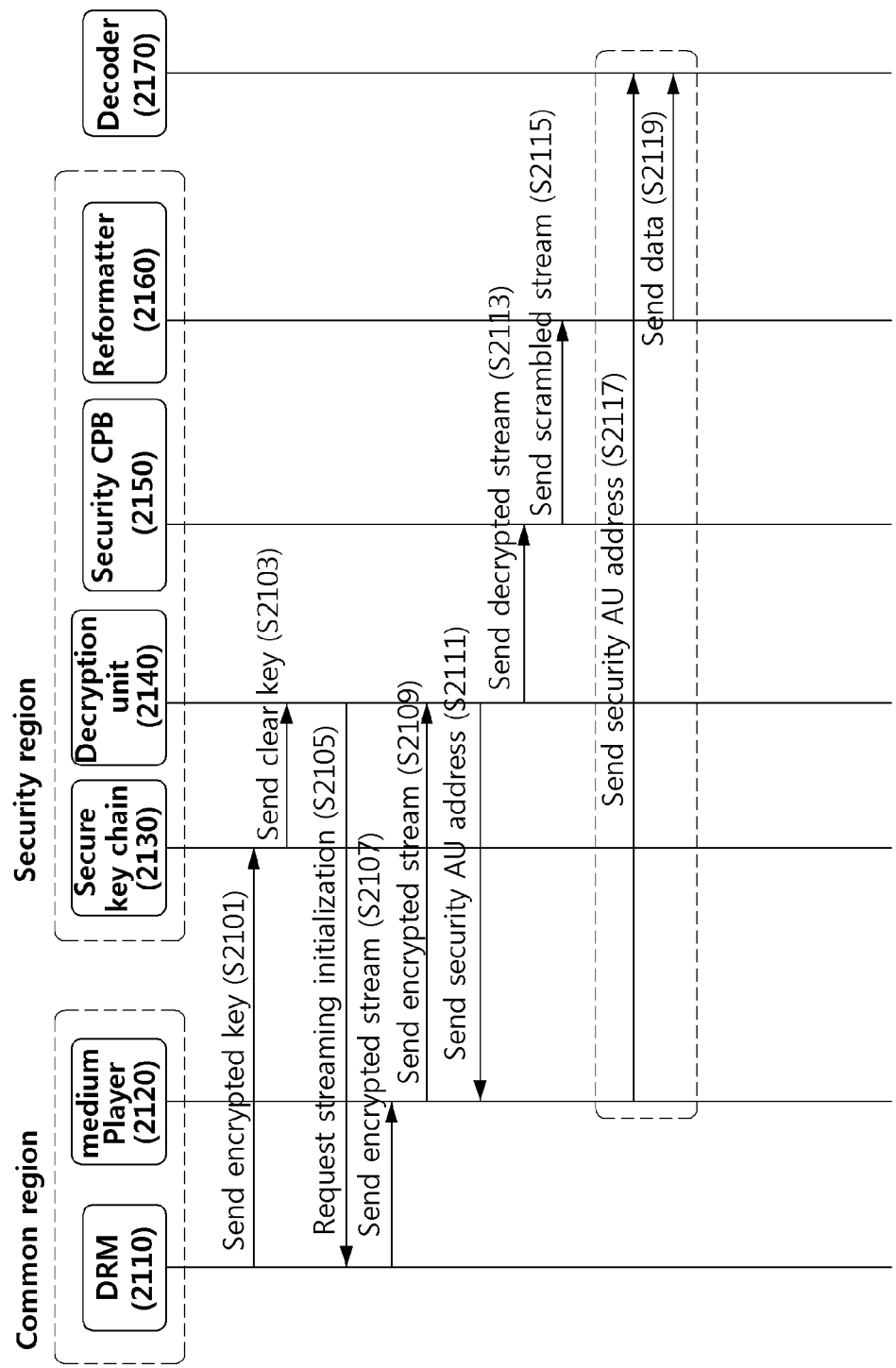
FIGS. 21 and 22 are embodiments to which the present invention is applied and illustrate a process of playing high definition content using interoperation between a common region to which security is not applied and a security region.
Figure 22:
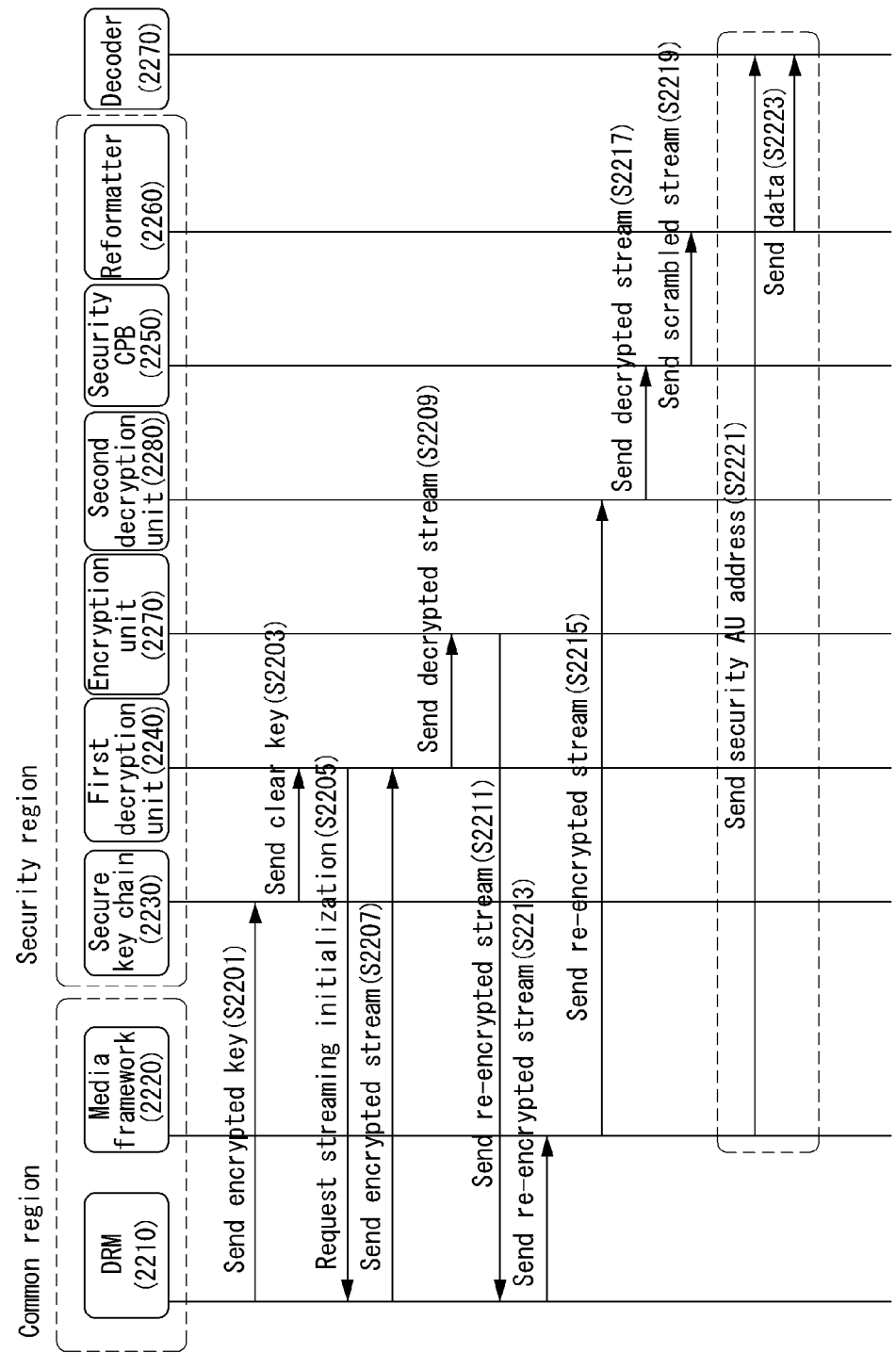

FIGS. 21 and 22 are embodiments to which the present invention is applied and illustrate a process of playing high definition content using interoperation between a common region to which security is not applied and a security region.

In order to use high definition content, a separate storage device is necessary, and a communication channel previously agreed between the storage device and a playback device is necessary. After interoperation through such a communication channel is completed, the high definition content may be used. If a purchased memory card is certified memory, the high definition content may be used while operating in conjunction with the playback device. In this case, license information may be fetched through connection with the license server or various methods.

High definition content may be used in an existing certified device while using existing content. In particular, a corresponding function may be added to the existing certified device even without changing to a separate platform for the high definition content and performing certification on a new device, and the high definition content may be used through interoperation with the added function.

A process of playing high definition content using interoperation between a common region to which security is not applied and a security region is described with reference to FIG. 21. In this case, the high definition content may include all of pieces of high definition content stored in a blueray disc (DB), USB memory, an SD card, an HDD, and an SDD. Furthermore, an example of a playback device may include Google Player.

First, digital rights management (DRM) 2110 in the common region may send encrypted key information to the secure key chain 2130 of the security region at step S2101. The secure key chain 2130 that has received the encrypted key information may send a clear key to a decryption unit 2140 at step S2103.

The decryption unit 2140 may request streaming initialization from the DRM 2110 at step S2105. The DRM 2110 may send the encrypted stream to a media player 2120 at step S2107, and the media player 2120 may send the encrypted stream to a decryption unit 2140 at step S2109.

The decryption unit 2140 may send the address of a security access unit to the media player 2120 at step S2111 and send a decrypted stream to a security CPB 2150 at step S2113. The security CPB 2150 may convert the decrypted stream into a scrambled stream and send the scrambled stream to a reformatter 2160 at step S2115.

The media player 2120 may send the address of the security access unit, received from the decryption unit 2140, to the decoder 2170 at step S2117.

Furthermore, the reformatter 2160 may send the security access unit data to a decoder 2170 at step S2119. In this case, step S2117 and step S2119 may be exchanged.

In another embodiment, a process of playing high definition content using interoperation between a common region to which security is not applied and a security region is described with reference to FIG. 22. In this case, an example of a playback device may include a media framework.

First, the DRM 2210 of the common region may send encrypted key information to the secure key chain 2230 of the security region at step S2201. The secure key chain 2230 that has received the encrypted key information may send a clear key to a first decryption unit 2240 at step S2203.

The first decryption unit 2240 may request streaming initialization from the DRM 2210 at step S2205. The DRM 2210 may send an encrypted stream to a media framework 2220, and the media framework 2220 may send the encrypted stream to the first decryption unit 2240 at step S2207.

The first decryption unit 2240 may send a decrypted stream to an encryption unit 2270 at step S2209. The encryption unit 2270 may encrypt the decrypted stream again and send the re-decrypted stream to the DRM 2210 at step S2211.

The DRM 2210 may send the re-encrypted stream to the media framework 2220 at step S2213. The media framework 2220 may send the re-encrypted stream to a second decryption unit 2280 at step S2215.

The second decryption unit 2280 may send a decrypted stream to a security CPB 2250 at step S2217. The security CPB 2250 may convert the decrypted stream into a scrambled stream and send the scrambled stream to a reformatter 2260 at step S2219.

The media framework 2220 may send the address of a security access unit to a decoder 2270 at step S2221. The reformatter may send the data of the security access unit to the decoder 2270 at step S2223. In this case, step S2221 and step S2223 may be exchanged.

INDUSTRIAL APPLICABILITY

The aforementioned preferred embodiments of the present invention have been disclosed for illustrative purposes, and those skilled in the art may improve, change, replace, or add various other embodiments within the technical spirit and scope of the present invention disclosed in the attached claims.

The invention claimed is:

1. A method for playing content stored in a storage device connected through at least one interface, the method comprising:
    detecting, by an interface unit, a connection of the storage device;
    transmitting, by a processor, transaction information to a license server, wherein the transaction information is stored in the storage device and comprises transaction identification information used for identifying a corresponding transaction and user;
    receiving, by the processor, license information from the license server, wherein the license information allows a playback of the content; and
    playing, by the processor, the content based on the license information,
    wherein the content includes contents corresponding to multiple versions, and the multiple versions represent an image quality,
    wherein each of the contents corresponding to multiple versions corresponds to right information, and the right information allows the storage device to obtain the license information,
    wherein, when the content is copied or moved to an unlicensed storage device by a user, only a data file of the content is transmitted and new license information is required to play the content, and
    wherein when the content is copied or moved to another storage device by a user, a certification unit checks whether a right to copy or move the content is present through a server, and the processor copies or moves the content to the another storage device when the right to copy or move the content is present.

2. The method of claim 1, wherein:
    a format of the content comprises location information, and
    the location information comprises at least one of license server location information and retailer location information.

3. The method of claim 1, wherein the interface comprises at least one of a universal serial bus (USB) interface, a high-definition multimedia interface (HDMI), a secure digital (SD) card reader, and a wired/wireless network.

4. The method of claim 1, wherein the step of playing the content comprises a step of determining whether the content is to be played based on level information of a playback device, wherein a function of the playback device corresponds to level information of the content.

5. The method of claim 4, wherein when the level information of the playback device is not lower than the level information of the content, the content is played.

6. A device for playing content stored in a storage device connected through at least one interface, the device comprising:
    an interface unit configured to detect a connection of the storage device;

a processor configured to:
  transmit, to a license server, transaction information stored in the detected storage device,
  receive, from the license server, license information allowing a playback of the content, and
  play the content based on the license information; and
a display configured to output the content, wherein the transaction information comprises transaction identification information to identify a corresponding transaction and user,
wherein the license information comprises a license file and a license key,
wherein the content includes contents corresponding to multiple versions, and the multiple versions represent an image quality,
wherein each of the contents corresponding to multiple versions corresponds to right information, and the right information allows the storage device to obtain the license information,
wherein, when the content is copied or moved to an unlicensed storage device by a user, only a data file of the content is transmitted and new license information is required to play the content, and
wherein when the content is copied or moved to another storage device by a user, a certification unit checks whether a right to copy or move the content is present through a server, and the processor copies or moves the content to the another storage device when the right to copy or move the content is present.

7. The device of claim 6, wherein:
a format of the content comprises location information, and
the location information comprises at least one of license server location information and retailer location information.

8. The device of claim 6, wherein the interface comprises at least one of a universal serial bus (USB) interface, a high-definition multimedia interface (HDMI), a secure digital (SD) card reader, and a wired/wireless network.

9. The device of claim 6, wherein:
the processor determines whether the content is to be played or not based on level information of a playback device, and
a function of the playback device corresponds to level information of the content.

10. The device of claim 9, wherein when the level information of the playback device is not lower than the level information of the content, the content is played.

* * * * *